US010663929B2

(12) United States Patent
Law et al.

(10) Patent No.: US 10,663,929 B2
(45) Date of Patent: May 26, 2020

(54) LONG-HAUL SAFETY SYSTEM TRIPS

(71) Applicant: FISHER-ROSEMOUNT SYSTEMS, INC., Round Rock, TX (US)

(72) Inventors: Gary K. Law, Georgetown, TX (US); Godfrey R. Sherriff, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 116 days.

(21) Appl. No.: 15/926,665

(22) Filed: Mar. 20, 2018

(65) Prior Publication Data
US 2019/0294124 A1 Sep. 26, 2019

(51) Int. Cl.
*G05B 9/02* (2006.01)
*G05B 19/418* (2006.01)
(Continued)

(52) U.S. Cl.
CPC ............ *G05B 9/02* (2013.01); *G05B 19/406* (2013.01); *G05B 19/4185* (2013.01); *G05B 19/0425* (2013.01); *G05B 19/0428* (2013.01); *G05B 2219/25228* (2013.01); *G05B 2219/45226* (2013.01); *H04L 43/50* (2013.01);
(Continued)

(58) Field of Classification Search
CPC .... G05B 9/02; G05B 19/406; G05B 19/4185; G05B 19/0425; G05B 2219/25228; G05B 19/0428; G05B 2219/45226; Y02P 90/18; H04L 43/50; H04W 4/027; H04W 4/08; H04W 72/005
See application file for complete search history.

(56) References Cited

U.S. PATENT DOCUMENTS 6,999,824 B2 * 2/2006 Glanzer .................. G05B 9/02
700/17
7,167,762 B2 * 1/2007 Glanzer .................. G05B 9/02
700/18
(Continued)

OTHER PUBLICATIONS

Moore Industries, "CCS® Cable Concentrator System®" Data Sheet 14.10, Moore Industries-International, Inc., 1-12 (1996).
(Continued)

*Primary Examiner* — Brian T O Connor
(74) *Attorney, Agent, or Firm* — Marshall, Gerstein & Borun LLP

(57) ABSTRACT

A long-haul process control plant includes a process control system which controls industrial processes running within the plant, and a safety instrumented system, servicing the process control system, which detects safety-related problems within the plant and communicates safety messages within and between portions of the process plant, e.g., to effect a trip or other mitigating action. To transmit safety messages between remotely located portions of the process plant via a low-bandwidth long-haul link, a safety data concentrator combines individual safety messages generated by the safety logic solvers disposed at one portion of the plant into a concentrated safety message, and transmits the concentrated safety message to a safety data de-concentrator in the remote portion of the plant. The safety data de-concentrator recovers the individual safety messages from the concentrated safety message and communicates the recovered safety messages to recipient safety logic solvers disposed at the remote portion of the plant.

28 Claims, 10 Drawing Sheets

(51) Int. Cl.

| | | |
|---|---|---|
| *G05B 19/406* | (2006.01) | |
| *H04W 4/08* | (2009.01) | |
| *H04W 72/00* | (2009.01) | |
| *H04W 4/02* | (2018.01) | |
| *H04L 12/26* | (2006.01) | |
| *G05B 19/042* | (2006.01) | |

(52) U.S. Cl.
CPC .............. *H04W 4/027* (2013.01); *H04W 4/08* (2013.01); *H04W 72/005* (2013.01); *Y02P 90/18* (2015.11)

(56) References Cited

U.S. PATENT DOCUMENTS

| | | | | |
|---|---|---|---|---|
| 7,289,861 | B2 | 10/2007 | Aneweer et al. | |
| 7,486,999 | B2 * | 2/2009 | Glanzer | G05B 9/02 700/18 |
| 7,809,449 | B2 * | 10/2010 | Esch | H04L 12/462 370/352 |
| 7,869,889 | B2 * | 1/2011 | Flanders | G05B 9/03 340/540 |
| 8,649,888 | B2 * | 2/2014 | Daraiseh | G05B 19/4184 340/3.43 |
| 8,676,357 | B2 * | 3/2014 | Boercsoek | G05B 19/4185 700/78 |
| 8,914,135 | B2 * | 12/2014 | Daraiseh | G05B 19/4184 700/79 |
| 9,219,442 | B2 * | 12/2015 | Eisenbeis | H02P 29/02 |
| 9,219,760 | B2 * | 12/2015 | Flanders | G05B 19/4185 |
| 9,705,934 | B2 * | 7/2017 | Flanders | G05B 19/4185 |
| 9,755,944 | B2 * | 9/2017 | Kitchener | H04L 43/50 |
| 10,222,770 | B2 * | 3/2019 | Meagher | G05B 19/02 |
| 10,255,797 | B1 * | 4/2019 | Al-Odail | G05B 23/0213 |
| 2011/0178611 | A1 * | 7/2011 | Daraiseh | G05B 19/4184 700/80 |
| 2014/0156033 | A1 * | 6/2014 | Daraiseh | G05B 19/4184 700/79 |
| 2014/0269744 | A1 * | 9/2014 | Flanders | G05B 19/4185 370/401 |
| 2016/0065622 | A1 * | 3/2016 | Flanders | G05B 19/4185 370/401 |
| 2017/0147427 | A1 * | 5/2017 | Nero | G06F 11/0796 |
| 2017/0169219 | A1 * | 6/2017 | Ogawa | G06F 21/556 |
| 2017/0171243 | A1 * | 6/2017 | Ogawa | G05B 19/048 |

OTHER PUBLICATIONS

Moore Industries, "On Target: The BULLET WirelessHART® Adapter Provides Immediate Benefits", Moore Industries-International, Inc., 1-4 (2013).

HART Communication Foundation, "WirelessHART—How it works" (2014). Retrieved from the Internet on Apr. 1, 2015: URL:http://en.hartcomm.org/hcp/tech/wihart/wireless_how_it_works.html.

HART Communication Foundation, "WirelessHART Security" (2014) Retrieved from the Internet on Apr. 1, 2015: URL:http://en.hartcomm.org/hcp/tech/wihart/wihart_security.html.

* cited by examiner

LONG-HAUL SAFETY SYSTEM TRIPS

TECHNICAL FIELD

The present disclosure generally relates to systems and methods for transporting safety messages between remotely located portions of a safety instrumented system operating in a process plant.

BACKGROUND

Distributed process control systems ("PCS") or process control networks, like those used in chemical, petroleum, industrial or other process plants to manufacture, refine, transform, generate, or produce physical materials or products, typically include one or more process controllers communicatively coupled to one or more field devices via analog, digital or combined analog/digital buses, and/or via one or more wired and/or wireless communication links or networks, as well as other components. The field devices, which may be, for example, valves, valve positioners, switches and transmitters (e.g., temperature, pressure, level and flow rate sensors), are located within the process environment (which is interchangeably referred to herein as the plant environment, field environment, or front-end environment of the process plant), and generally perform physical or process control functions such as opening or closing valves, measuring process parameters such as pressure, temperature, etc. to control one or more industrial processes executing within the process plant or system. Smart field devices, such as the field devices conforming to the well-known Fieldbus protocol, may also perform control calculations, alarming functions, and other control functions commonly implemented within a process controller. The process controllers, which are also typically located within the plant environment, receive signals indicative of process measurements made by the field devices and/or other information pertaining to the field devices and execute respective controller applications that run, for example, different control modules which make process control decisions, generate control signals based on the received information, and coordinate with the control modules or blocks being performed in the field devices, such as HART®, WirelessHART®, and FOUNDATION® Fieldbus field devices. The control modules in a process controller send the control signals over the communication links to the field devices to thereby control the operation of at least a portion of the process plant or system, e.g., to control at least a portion of one or more industrial processes running or executing within the plant or system. I/O devices, which are also located within the plant environment, typically are disposed between a controller and one or more field devices and enable communications therebetween, e.g., by converting electrical signals into digital values and vice versa. As utilized herein, the term "process control devices" generally refers to field devices, controllers, and I/O devices which are generally located, disposed, or installed in a field environment of a process control system or plant.

Still further, in many process or industrial plants, the process control network is coupled to a safety instrumented system ("SIS") which operates to detect significant safety-related conditions, issues, or problems within the process control system and/or the process plant (e.g., an oscillation that is escalating in amplitude over time, a stream of values that are out of expected range, a portion of the process becoming uncontrolled, the occurrence of one or more conditions which might result in or lead to a serious hazard in the plant, such as a leak of toxic chemicals, a stuck valve, etc.). Safety instrumented systems support or service at least portions of the process control system within the process plant, communicate safety messages between devices and/or portions of the process plant in order to automatically trigger preventative or mitigating actions, such as closing or opening valves, removing power from devices, switching flows within the plant, tripping or placing one or more devices into safe mode, and/or other preventative or mitigating actions. Generally speaking, safety instrumented systems include one or more safety controllers which typically are separate and distinct from the process control controllers operating within the plant to control the process. SIS controllers may include one or more safety system logic solvers, which may be communicatively connected to safety field devices via safety buses, communication lines, links, wired networks, and/or wireless networks installed within the process plant, and, in some arrangements, may be communicatively connected to process control field devices and controllers. Typically, SIS devices such as SIS controllers, devices, logic solvers, etc. communicate with one another over safety communication buses, links, networks, etc. in a direct, point-to-point manner, e.g., at the I/O level of the process control system (for example, by using a message format that is utilized and/or implemented for communications by I/O cards included in the process control system), or other suitable communications level.

Safety system logic solvers execute respective safety information function (SIF) routines that receive and process respective input signals generated by other safety system logic solvers or controllers, safety field devices, process control field devices, and/or process control controllers, and that are indicative of various conditions such as, for example, value(s) of particular parameters, the position of certain safety switches or shutdown valves, overflows or underflows in the process, the operation of important power generation or control devices, the operation of fault detection devices, etc. A safety information function routine operates on the received inputs in accordance with its respective logic to determine whether or not the combination of received inputs is indicative of an occurrence of a safety-impacting or safety-related event (e.g., "safety events") within the process plant, or probability thereof. A safety event may be detected or indicated by, for example, a single condition occurring in one portion of the plant, the simultaneous occurrence of two or more conditions in one or more portions of the plant, and the like. Generally speaking, although not necessarily, a "true" signal that is output by a safety function routine upon receiving multiple input signals and processing the inputs in accordance with the routine logic to generate the output is indicative of the occurrence of a safety event, or a significant probability thereof. When the occurrence of a safety event (or significant probability thereof) is detected, a safety controller takes some action to limit the detrimental nature of the event, such as sending control signals to close valves, turn devices off, remove power from devices and/or sections of the plant, etc. For example, a safety controller may send control signal(s) to force other devices or components into a tripped state or "safe" mode of operation designed to prevent or mitigate the effects of a serious or hazardous condition within the process plant.

Information from the field devices, the process controllers, and the safety system logic solvers (also called safety controllers) is usually made available over one or more data highways or communication networks to one or more other hardware devices, such as operator workstations, personal computers or other types of computing devices with user interfaces, data historians, report generators, centralized databases, or other centralized administrative computing devices that are included in the process control network and that are typically placed in control rooms or other locations away from the harsher field environment of the plant, e.g., in a back-end environment of the process plant. Each of these hardware devices typically is centralized across the process plant or across a portion of the process plant. These hardware devices run applications that enable a control or a safety system operator to perform functions with respect to controlling a process and/or operating the process plant, such as changing settings of the process control routine or a safety routine, modifying the operation of the control modules within the process controllers, the safety system controllers, the field devices, etc., viewing the current state of the process, viewing alarms generated by field devices, the process controllers, or the safety system controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths. Typically, data highways/communication networks that transport control information generated by process control field devices and controllers are separate and distinct from data highways/communication networks that transport safety information generated by safety field devices and controllers, although in some configurations, at least some portions of a control data highway and a safety data highway may be integral or commonly implemented.

As an example, the DeltaV™ process control system, sold by Emerson Process Management, includes multiple applications stored within and executed by different devices located at diverse places within a process plant. A configuration application, which resides in one or more workstations or computing devices in the back-end environment of a process control system or plant, enables users to create or change process control modules and download these process control modules via a data highway to dedicated distributed controllers. Typically, these control modules are made up of communicatively interconnected function blocks, which may be objects in an object oriented programming protocol that perform functions within the control scheme based on inputs thereto and that provide outputs to other function blocks within the control scheme. The configuration application also allows a configuration designer to create or change operator interfaces which are used by a viewing application to display data to an operator and to enable the operator to change settings, such as set points, within the process control routines. Each dedicated controller (such as the process controllers and the safety system controllers) and, in some cases, one or more field devices, stores and executes a respective controller or safety application that runs the control modules assigned and downloaded thereto to implement actual process control and/or safety system functionality.

Moreover, one or more user interface devices, or plant display applications which are executed on one or more user interface devices, such as operator workstations, one or more remote computing devices in communicative connection with the operator workstations and the data highway, etc., receive data from the controllers and the field devices via the data highway(s) and display this data to process control system designers, operators, or users via a user interface screen. These user interface devices or applications provide any of a number of different views, such as an operator's view, an engineer's view, a technician's view, etc. tailored to actions performed by different users in the plant. Moreover, a data historian application is typically stored in and executed by a data historian device that collects and stores some or all of the data provided across the data highway(s) while a configuration database application runs in a still further computer attached to the data highway(s) to store the current process control routine configuration and data associated therewith. Alternatively, the configuration database may be located in the same workstation as the configuration application.

In long-haul process plant configurations (e.g., such as oil pipelines, offshore platforms, remote wellheads, etc.), interconnected portions of a field environment of the process control system may be situated or located remotely from one another (e.g., a great distance apart from one another, and/or separated by physical obstructions, barriers, or obstacles such as water, mountains, underground wells, etc.). For instance, one or more portions of the process control system may be geographically distant from the rest of the system, e.g., may be located underground while the rest of the system is located aboveground, located underwater while the rest of the system is on land, located miles away in the desert while the rest of the system is situated in a city, etc. However, safety conditions arising even in very remote portions of a process control system can in some instances affect the safety of other portions of the process control system at other locations and/or as a whole, and vice versa. Accordingly, in many cases, communicating safety messages between distant portions of a safety instrumented system that services the process control system is necessary to prevent plant hazards, such as toxic chemical spills, explosions, etc. and/or to prevent or mitigate the effects of even minor safety events. Currently known safety instrumented systems typically communicate safety messages between local portions of a process plant using local communication buses or local data highways, and typically communicate safety messages between portions of the process plant that are separated by long-haul distances (e.g., that are remotely located) by using higher-bandwidth links, such as satellites and fiber-optic cables. However, such high-bandwidth links are expensive to use and, in the case of satellite communications, rely on a third-party vendor. Moreover, for some lower rate, slow-communication safety messages (e.g., heartbeat messages, and the like), the amount of bandwidth provided by high-bandwidth links is overkill and thus their use is not a prudent financial decision. On the other hand, while a lower-bandwidth or otherwise "slower" transport link is less expensive to use for data transport between portions of a safety system that are separated by long-haul distances, typically a lower-bandwidth link does not efficiently and effectively transport large or frequently-generated safety messages over long-haul distances with sufficient fidelity and within the time constraints needed to maintain safe operations of a process plant.

SUMMARY

The systems, methods, devices, and techniques disclosed herein allow safety messages (e.g., safety message packets) to be transported more efficiently and effectively between portions of a Safety Instrumented System (SIS) of a process plant that are physically separated by long-haul distances, and with less cost as compared to using higher bandwidth links such as satellites and fiber-optic cables. The systems, methods, devices and techniques disclosed herein are particularly suited for transporting small and/or infrequently transmitted safety messages across long-haul distances in an efficient, effective, and low-cost manner, however, they are not limited to transporting only such types of safety messages. Moreover, the systems, methods, devices, and techniques disclosed herein are easily and simply integrated into an existing (e.g., previously installed) Safety Instrumented System (SIS) of a process plant in which an industrial process is being executed and controlled by a process control system.

In an embodiment, a safety data concentrator (SDC) is paired with a safety data de-concentrator (SDD) and communicatively connected thereto by a long-haul communication link. The SDC is situated or located within a safety instrumented system (SIS) supporting a process control system (PCS) of a process plant, at or near a transmitting end of a long-haul portion of the process plant, and the SDD is situated or located at or near the receiving end of the long-haul portion of the process plant. For example, in an illustrative configuration, an SDC is situated on land, and its paired SDD is situated at a drilling station located miles away in the ocean. The long-haul communication link communicatively connecting the SDC and SDD has a lower bandwidth (e.g., is "slower" or has less capacity) than long-haul, high-bandwidth communication links that are typically used in long-haul configurations, such as satellite links and fiber-optic cables. For example, the long-haul, lower-bandwidth communication link may be implemented via an undersea cable, a long range wireless link, a non-satellite terrestrial wireless link, a communication link that is piggybacked onto (e.g., overlaid onto or otherwise supported by) a wired communication link, a lower bandwidth VPN (Virtual Private Network) or virtual link included or contained in a higher band-width link, etc.

Each of the SDC and the SDD is connected to a respective set of safety logic solvers (LS) that are physically located at its respective end of the long-haul portion of the process plant. From the perspective of the safety logic solvers, the SDC and the SDD appear to be I/O cards or some other known transport mechanism via which safety logic solvers and devices typically communicate with one another, e.g., at the I/O level, and/or using some other known communication format at a known communication level or layer. That is, the safety logic solvers are ignorant of the speed, the distance, and indeed, the physical transport mechanism via which their safety messages are transmitted and received. Indeed, in some implementations, the safety logic solvers are ignorant of the presence of the SDC and the SDD. As such, safety messages that are sent and/or received by logic solvers appear to the logic solvers as being locally communicated irrespective of whether an SDC/SDD pair is used for transport or not. That is, whether or not the long-haul transport mechanism including the SDC/SDD pair is utilized is transparent to the logic solvers.

Generally speaking, an SDC compresses and/or consolidates multiple, individual safety messages into a concentrated safety message (e.g., a single, concentrated safety message), and transmits the concentrated safety message over the long-haul, lower-bandwidth communication link to the SDD. Upon reception of the concentrated safety message, the SDD mines or otherwise recovers the individual safety messages from the concentrated safety message and provides them to their intended recipients. As such, by using an SDC/SDD pair and a lower-bandwidth long-haul communication link, less overall bandwidth is utilized to deliver safety messages between remotely-situated portions of the process plant, and therefore significant savings in bandwidth utilization and cost for safety message transmission, especially over long distances, are realized. Additionally, the compression, consolidation, and/or concentration of multiple safety messages into a group message advantageously lessen the chance of individual message content errors. Further, as the use of the SDC/SDD pair and the long-haul communication link is transparent to safety logic solvers, the SDC/SDD pair may be seamlessly added to an existing SIS system without needing to re-configure embedded safety system components such as logic solvers and devices.

In one aspect, a safety instrumented system for use in a long-haul process plant having a process control system is disclosed. The safety instrumented system includes a safety data concentrator communicatively connected to one or more safety logic solvers that are disposed in a first portion of the safety instrumented system and that are in operative communication with one or more process control devices and/or safety devices of the process control system serviced by the safety instrumented system. The one or more process control devices of the process control system perform one or more physical functions to thereby control the industrial process executing in the long-haul process plant. The safety data concentrator is configured to combine a plurality of safety messages generated by the one or more safety logic solvers into a single, concentrated safety message, where the single, concentrated safety message has a total length that is less than the sum of the respective lengths of the safety messages included in the plurality of safety messages. Additionally, the safety data concentrator is configured to transmit the concentrated safety message via a long-haul link to a second portion of the safety instrumented system.

In another aspect, a method for use in a safety instrumented system servicing a process control system of a long-haul process plant is disclosed. The method includes receiving, by a safety data concentrator communicatively connected to a first set of one or more safety logic solvers that are disposed in a first portion of a safety instrumented system and that are in operative communication with a first set of one or more process control devices of a process control system serviced by the safety instrumented system, a plurality of safety messages generated by the first set of one or more safety logic solvers. The method further includes combining, by the safety data concentrator, the plurality of safety messages into a single concentrated safety message, where the single, concentrated safety message has a total length that is less than the sum of the individual lengths of the safety messages included in the plurality of safety messages. Additionally, the method includes transmitting, by the safety data concentrator, via a long-haul link to a second portion of the safety instrumented system, the single, concentrated safety message to a safety data de-concentrator communicatively connected to a second set of one or more safety logic solvers that are disposed in a second portion of the safety instrumented system and that are in operative communication with a second set of one or more process control devices of the process control system, where the safety data concentrator is configured to recover the plurality of safety messages from the concentrated safety message for communication to the second set of safety logic solvers, and the first set of one or more process control devices and second set of one or more process control devices perform one or more physical functions to thereby control an industrial process executing in the long-haul process plant.

In still another aspect, a method for use in a safety instrumented system servicing a process control system of a long-haul process plant is disclosed. The method includes receiving, by a safety de-concentrator, via a long-haul link from a first portion of the safety instrumented system, a single, concentrated safety message transmitted by a safety data concentrator communicatively connected to a first set of one or more safety logic solvers that are disposed in the first portion of the safety instrumented system and that are in operative communication with a first set of one or more process control devices of a process control system serviced by the safety instrumented system. The safety data concentrator is configured to combine a plurality of safety messages generated by the first set of one or more safety logic solvers into the single, concentrated safety message, and the safety data de-concentrator is communicatively connected to a second set of one or more safety logic solvers that are disposed in a second portion of the safety system and that are in operative communication with a second set of one or more process control devices of the process control system. Additionally, the first set of one or more process control devices and the second set of one or more process control devices perform one or more physical functions thereby controlling an industrial process executing in the long-haul process plant. The method further includes recovering, by the safety data de-concentrator, the plurality of safety messages from the single, concentrated safety message, and communicating the recovered plurality of safety messages to the second set of one or more safety logic solvers.

DETAILED DESCRIPTION

Figure 1:
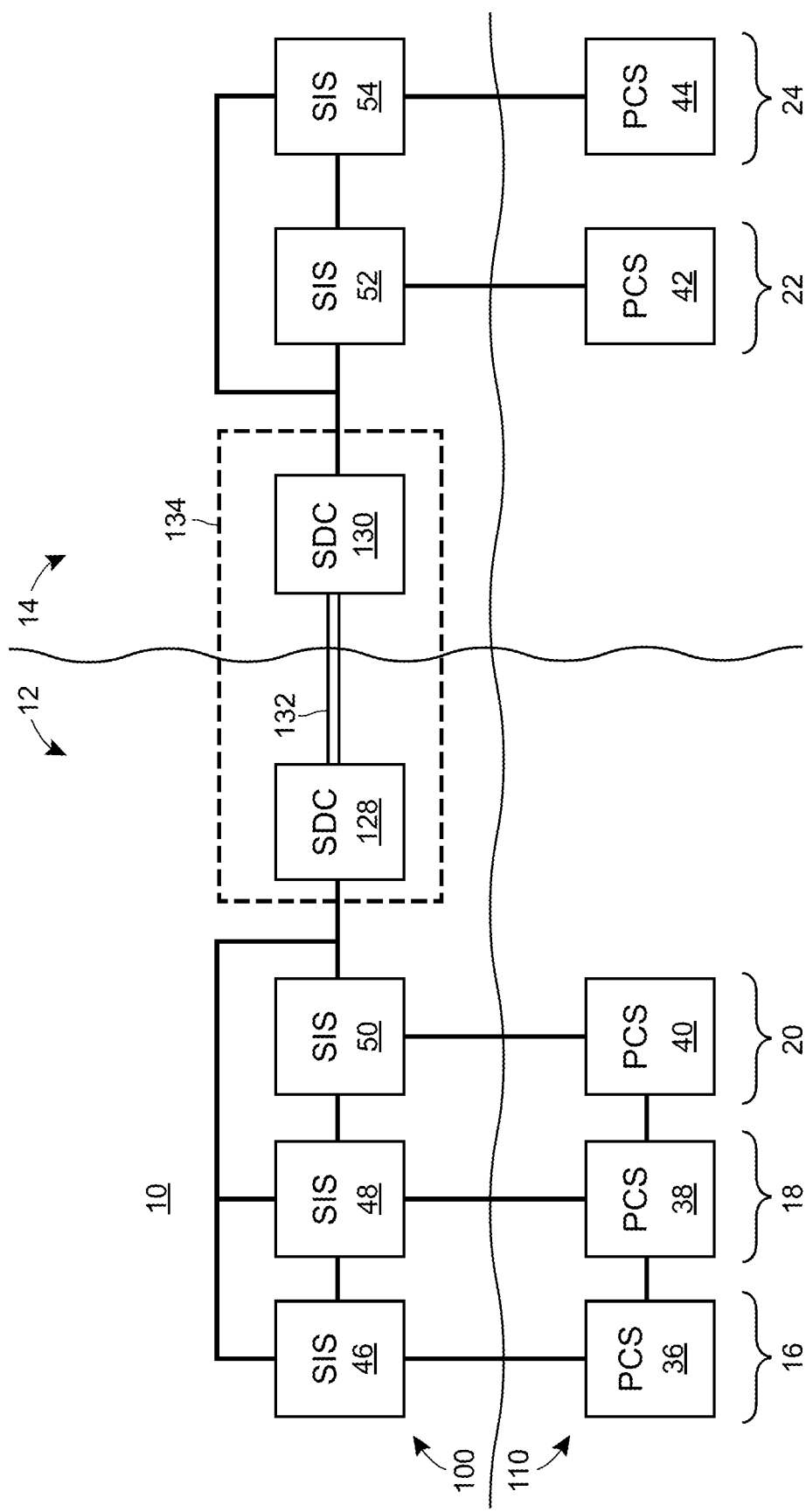
FIG. 1 depicts a block diagram of an exemplary safety instrumented system (SIS) servicing an exemplary process plant that includes a long-haul configuration.

In long-haul process plant configurations such as oil pipelines, offshore platforms, remote wellheads, etc., interconnected portions of a process control system may be remotely or distantly located from one another (e.g., a great distance apart, geographically distant, or separated by physical obstructions, barriers, or obstacles such as water, mountains, underground wells, etc.). For instance, a remote portion of the process control system may be located underground while the rest of the system is located aboveground, located underwater while the rest of the system is on land, etc. As one example, submerged oil wells are drilled from offshore oil platforms, which can be, e.g., an artificial island, floating, fixed to an ocean floor, etc. These offshore oil platforms are often located hundreds of miles from land, and their associated submerged oil wells are typically thousands of feet below sea level. Moreover, oil extracted from such wells must typically be piped back to a land-based facility for refining. Thus, in this example, collectively, the submerged oil wells, offshore oil platforms, and land-based refinery facility comprise the process plant. From one perspective, the "local" portion of the process plant includes the land-based refinery, while the "remote" portions of the process plant include the offshore oil platforms and submerged oil wells. From another perspective, the "local" portion of the process plant is a particular offshore oil platform/well, and the "remote" portions include other offshore platforms/wells and the land-based refinery. Operations of the process plant are controlled by a process control system having portions that are respectively integrated into each local and remote environment, and safety risk of the process plant is managed, at least in part, by a safety instrumented system having portions that are respectively integrated into each local and remote environment. Additionally, the local portion and the remote portions of the process plant are connected via one or more long-haul transmission links.

Safety conditions arising even in very remote portions of a process control system can affect the safety of the process control system as a whole and/or at local portions of the process control system, and vice versa. For example, an oil leak at any point in an oil extraction and refinement process plant can create an unsafe condition with the potential for explosion and/or other undesirable consequences at other local or remote portions of the process plant. Moreover, safety conditions arising in a remote portion of a process control system may in some instances be prevented by actions of other portions of the process control system. For example, if an oil leak is detected in one portion of a plant, a valve that is remotely located in another portion of the plant may be closed in order to reduce or prevent the flow of oil through the leak.

Consequently, the communication of safety messages between local and remote portions of a process control system is necessary to prevent plant hazards, such as toxic chemical spills (e.g., ocean oil spills), explosions, etc. Safety instrumented systems that service process plants typically communicate safety messages between local portions of a process plant using a local communication bus or local data highway, which may or may not be the same data highway used by the process control system for communicating process control-related messages. In long-haul configurations (e.g., configurations in which portions of the process plant are distributed over long distances, and/or are distributed across physical barriers such as water, mountains, underground wells, etc.), safety data highways that are used to reach remote portions of the process plant are typically implemented using high-bandwidth links that are able to span long distances, such as satellite links. However, such high-bandwidth links are quite expensive to use, and, in the case of satellite communications, rely on third-party vendors. On the other hand, less expensive lower-bandwidth or otherwise "slower" transport links (e.g., non-satellite terrestrial wireless, links that are piggy-backed onto wired communication links, a lower bandwidth VPN (Virtual Private Network) included in an overall higher bandwidth link, etc.) are not typically capable of efficiently and effectively transporting large or frequently-issued safety messages across long-haul distances. For example, if an attempt is made to send large-sized safety messages or a large number of safety messages over a low-bandwidth link across long-haul distances, especially over a short period of time, the link may become overwhelmed and some of the safety messages may be delayed or simply may not be transmitted. However, because safety messages are time-sensitive, delays and/or other problems with the communication of safety messages can lead to unsafe operating conditions in the process plant.

The systems, methods, and/or techniques disclosed herein address these and other shortcomings of known, long-haul SIS systems by using a safety data concentrator (SDC) and a safety data de-concentrator (SDD) for communicating safety messages between remotely-situated portions of a process plant via a lower-bandwidth long-haul communication link spanning the distance between the remotely-situated portions. In an embodiment, an SDC is integrated into a first portion of a safety instrumented system servicing a process control system, and combines individual safety messages generated by various devices and components included in the first portion of the process control system into a concentrated safety message (e.g., into a single, concentrated safety message). The SDC transmits the concentrated safety message via the lower-bandwidth long-haul link to an SDD which is integrated into a second portion of the safety instrumented system that is remotely situated (e.g., at a long-haul distance) from the first portion. The SDD recovers the individual safety messages from the concentrated safety message, and communicates the recovered safety messages to their respective receiving devices or components disposed in the second, remote portion of the safety instrumented system.

Specifically, in an example arrangement, the SDC is communicatively connected to a set of safety logic solvers disposed in the first portion of the process plant. The safety logic solvers are in turn communicatively connected to a plurality of process control devices (e.g., controllers, process control field devices, safety field devices, etc.), typically (but not necessarily) at an I/O level. The safety logic solvers monitor the process control devices and corresponding message traffic and detect safety-related conditions that arise within the plant. Safety-related or safety-impacting conditions may be detected based on, for instance, process conditions such as parameter values, the position of certain safety switches or shutdown valves, overflows or underflows in the process, the operation of important power generation or control devices, the operation of fault detection devices, status and/or data generated by the monitored devices, etc., and/or combinations thereof. When a safety-related condition is detected, the safety logic solvers generate safety messages or signals and distribute them to appropriate devices and components throughout various portions of the plant to cause corresponding safety actions to occur. Different types of safety messages or signals may distributed, for example, trip messages/signals, shut down messages/signals, alarm messages/signals, warning messages/signals, enter safe mode messages/signals, activate interlock messages/signals, and the like.

Safety messages are locally distributed within and between local portions of the plant by known local safety communication mechanisms, e.g., via a local safety data highway or local safety communication bus, such as, for example, the local ring communication bus described in U.S. Pat. No. 7,289,861. In some process plant configurations, the local safety communication bus or data highway is different than and separate from any of the communication networks (e.g., data highways, wireless networks, communication buses, etc.) utilized by the process control system. In other process plant configurations, at least some portions of the local safety communication bus/data highway and at least some portions of one or more process control system communication buses/data highways are integrally implemented. On the other hand, safety messages that are to be remotely distributed to devices disposed in remotely-situated portions of the plant are provided to the SDC for concentration and delivery/distribution to the remotely-situated plant portions via the long-haul communication link, as is described in more detail below. The safety messages, whether distributed locally or remotely, and when received by appropriate devices or components, trigger actions to limit the detrimental nature of the detected safety-related conditions, such as by sending control signals to, e.g., turn devices off, remove power from sections of the plant, closing valves, switch safety devices and/or control devices into a tripped or "safe" mode, generate an alarm, etc. In some situations, a received safety message may itself be a condition that is combined by a logic solver with other detected conditions to determine whether or not to initiate or trigger a safety action.

Advantageously, in an embodiment, at a first portion of the process plant, safety logic solvers provide safety messages to the SDC in the same or similar manner in which they provide safety messages to one another and/or with locally disposed process control devices within the first portion of the process control system. In one example implementation, safety logic solvers communicate safety messages to local safety field devices, to other locally-disposed safety logic solvers, and to the SDC directly at the I/O level. At the SDC, multiple, individual safety messages that are received from safety logic solvers are combined and condensed (e.g., by compressing, concentrating, multiplexing, wrapping, etc.) into a concentrated safety message (e.g., a single concentrated safety message) that is smaller in size or length than the sum of the individual sizes/lengths of the multiple, individual safety messages. The SDC may combine a group of individual safety messages into a single, concentrated safety message based, for example, on one or more characteristics of the long-haul communication link (e.g., available and/or maximum bandwidth). Additionally or alternatively, the SDC may combine a group of safety messages into a concentrated safety message based on one or more characteristics of the messages, e.g., the content of the individual safety messages, the absence or presence of certain safety messages, an expected time of transmission for one or more of the safety messages, a time by which a recipient device should receive a safety message, etc. The SDC transmits the concentrated safety message to the SDD over a long-haul link from the first portion of the process plant to the second, remotely-situated portion of the process plant. Because the concentrated safety message is smaller in size than the sum of the individual sizes of the multiple safety messages, the bandwidth needed to communicate the multiple safety messages between the remotely-situated first and second portions of the plant is reduced. Accordingly, by combining and condensing the safety messages before transmission, the SDC advantageously facilitates a lower-bandwidth transmission of safety message information to remote portions of the process plant within the constraints of the long-haul link while maintaining fidelity and decreasing the chances of messages being dropped due to overload conditions.

At the second portion of the process plant that is situated at a long-haul distance from the first portion of the process plant, upon receiving the concentrated safety message via the long-haul link, the SDD recovers (e.g., by extracting, decompressing, separating, de-multiplexing, unwrapping, etc.) the individual safety messages from the received, concentrated safety message. The SDD transmits the recovered safety messages (for example, directly at the I/O level via the safety communication buses or links, and/or via one or more process control communication buses or links) to recipient safety logic solvers and/or other recipient devices that are respectively indicated by the recovered safety messages and that are disposed within the second portion of the plant. Subsequently, the safety logic solvers may take appropriate actions based on the received individual safety messages, e.g., by distributing respective safety messages to appropriate recipient process control devices, process controllers, safety devices, and/or safety controllers disposed in the remote portion of the plant, by sending one or more control messages and/or signals to cause a trip or other mitigating action to occur, by generating an alarm, etc.

Thus, generally speaking, the SDC and the SDD are a mirrored pair, which may be bi-directional in their communications. In an example implementation, the outputs of the SDC are directly logically connected to the inputs of the SDD, and vice versa, via the transport mechanism comprising the lower-bandwidth long-haul link.

Advantageously, by the SDC compressing and combining individual safety messages into a concentrated message, and by the SDD recovering the individual safety messages from the concentrated message, the SDC and SDD facilitate the efficient and effective transport, over the lower-bandwidth long-haul link, of safety messages generated by devices disposed in the local portion of the process plant to recipient devices disposed in the remote portion of the process plant. That is, generally speaking, data can be more efficiently and effectively transported via the lower-bandwidth long-haul link when safety messages or packets are configured in a manner that takes into account the bandwidth and other constraints of the lower-bandwidth long-haul link, such as by limiting the packets to a certain size and/or to a certain frequency. Accordingly, by compressing and combining pluralities of safety messages generated by the safety logic solvers into concentrated safety messages, the SDC may reduce both the size (e.g., by compressing the safety messages) and the frequency (e.g., by combining groups of safety messages to be sent together at less frequent intervals, rather than sending each message immediately as it is received) of the safety messages that are transmitted from the first portion of the process plant to the second, remote portion of the process plant. When the size and the frequency of transmitted safety messages are reduced, the lower bandwidth long-haul link can be effectively and efficiently used for the transmission of safety messages to remote portions of the plant without overwhelming the link and possibly dropping critical safety messages. As such, the lower cost lower-bandwidth long-haul link is able to be utilized to maintain the safety of the process plant without loss of fidelity and without increasing safety-related risks.

It is noted that in some configurations, a safety instrumented system may include both a lower-bandwidth long-haul link and a standard, higher-bandwidth long-haul link. As such, the most appropriate long-haul link may be utilized for delivery of different types of safety messages. For example, a safety message of extremely high urgency may be sent via both the higher-bandwidth and lower-bandwidth long-haul link. On the other hand, heartbeat messages may be communicated via the lower-bandwidth long-haul link exclusively.

It is also noted that the SDC and SDD may (but are not required to) be bi-directionally coupled. For example, an SDC disposed at a first end of a long-haul link may serve as a concentrator for messages that are to be delivered to the other end of the long-haul link, and may serve as a de-concentrator for messages that are received from the other end of the long-haul link, while an SDD paired with the SDC may be disposed at the other end of the long-haul link and may perform the same functionalities for the other end of the long-haul link.

In some embodiments, in addition to their respective concentrating and de-concentrating functions, the SDC and/or the SDD includes respective internal logic for processing particular conditions to detect the presence of one or more safety events which may trigger a trip or other mitigating action. Generally, but not necessarily, such conditions relate to the lower-bandwidth long-haul link. For example, the arrival, at the SDC and/or at the SDD, of particular communication packets and/or communication packets including particular indicators, either alone or in combination, may trigger a trip of one or more components or devices in some instances. Additionally or alternatively, a trip of one or more components or devices may be triggered when the SDC and/or SDD detects conditions such as a loss of communication packets over the long-haul link (e.g., over a certain period of time), bad or poor quality communication packets received over the long-haul link (e.g., over a certain period of time), the extent to which the quality of the communication packets is bad or poor, etc.

An additional advantage of the systems, methods, and techniques disclosed herein is that the SDC and SDD are able to be seamlessly integrated into existing safety instrumented systems. That is, because communications between the safety logic solvers and the SDC and/or SDD utilize the same level and form of communication as is used between the safety logic solvers and other local devices (e.g., other safety logic solvers, process control I/O devices, safety field devices, process control field devices, process controllers, etc.), embedded safety logic solvers are ignorant of the fact that they are utilizing an SDC and/or an SDD for the long-haul transmission and/or receipt of safety messages. For example, safety logic solvers may communicate with both local devices and with the SDC/SDD at the I/O level, and sender/recipient addresses of individual safety messages/signals may be maintained in the concentrated safety message. Accordingly, from the perspective of the safety logic solvers, the safety messages appear to be individually transmitted and received locally. Consequently, the SDC and SDD are easily integrated into existing safety instrumented systems of local and remote portions of a process plant, and easily facilitate the communication of safety messages between the existing safety logic solvers of each system. Beneficially, no hardware or software changes to safety logic solvers are necessary to implement the SDC, SDD, and long-haul link into an existing safety instrumented system of a process plant. Accordingly, the arrangement of the SDC/long-haul link/SDD functions within the SIS as a logical, long-haul transport pipe.

FIG. 1 depicts a high-level block diagram of an example process plant 10 including an exemplary safety instrumented system (SIS) 100 and an exemplary process control system (PCS) 110, and in which different portions of the field environment of the plant 10 are geographically located across a long-haul distance, e.g., a "long-haul" process plant 10. As depicted in FIG. 1, the process plant 10 includes a local environment 12, and includes a remote environment 14 that is situated at a long-haul distance from the local environment 12. The local environment 12 includes local environment portions 16, 18, and 20, and the remote environment portion 14 includes remote environment portions 22 and 24. Each of the local environment portions 14, 16, 18 and the remote environment portions 22, 24 includes a respective portion 36-44 of the process control system (PCS) 110 operating within the process plant 10 as well as a respective portion 46-54 of the SIS 100 servicing the respective portion 36-44 of the PCS 110. Generally speaking, the PCS 110 controls one or more industrial processes of the process plant 10 in real-time, while the SIS 100 detects safety-related problems and/or conditions arising within the PCS 110 and/or the process plant 10, and generates and transmits safety messages/signals within and between portions of the process plant 10 to prevent or limit the detrimental nature of detected safety-related conditions, such as by sending control signals to, e.g., turn devices off, remove power from sections of the plant, closing valves, switch safety devices and/or control devices into a tripped or "safe" mode, etc. In some situations, a received safety message may itself be a condition that is combined by a logic solver with other detected conditions to determine whether or not to initiate a safety trigger.

As depicted in FIG. 1, within the local environment 12, local portion 46 of the SIS 100 services local portion 36 of the PCS 110, local portion 48 of the SIS 100 services local portion 38 of the PCS 110, and local portion 50 of the SIS services local portion 40 of the PCS. Similarly, within the remote environment 14, remote portion 52 of the SIS 100 services remote portion 42 of the PCS 110, and remote portion 54 of the SIS 100 services remote portion 44 of the PCS 110. Of course, the number and arrangements of the SIS portions 46-54 and the PCS portions 36-44 shown in FIG. 1 are exemplary and are for ease of discussion (and not limiting) purposes. For example, the local environment 12 (and/or the remote environment 14) may include any number of SIS portions servicing any number of PCS portions in a one-to-one, one-to-many, or many-to-one arrangement, as desired. Furthermore, portions of the SIS disposed entirely within the local environment 12 (or entirely within the remote environment 14) may be communicatively interconnected in any suitable manner (e.g., via one or more direct cross connections, a ring, etc.). Similarly, portions of the PCS disposed at the local environment 12 (or the remote environment 14) may be communicatively interconnected in any suitable manner.

At any rate, as discussed above, safety conditions arising in one portion 12 of the plant 10 may affect the safety of the plant 10 as a whole and/or at a remotely-situated portion 14 of the plant 10, and vice versa. Moreover, preventative or mitigating actions taken in one portion 12 of the plant may help to prevent or mitigate safety events and conditions in other parts 14 of the plant 10 (and vice versa) as well. Accordingly, in order to effectively manage safety risk within the process plant 10, safety-related messages indicative of safety conditions in the plant 10 must be able to be sent within and between local portions of a plant 10 (e.g., locally between one of local SIS portions 46, 48, 50 and another local SIS portion 46, 48, 50; and locally between the remote SIS portions 52 and 54) as well as between remotely-located portions of the plant 10 (e.g., between one or more of local SIS portions 46, 48, 50 and one or more remote SIS portions 52, 54) to trigger appropriate preventative and/or mitigating actions. To facilitate the delivery of safety messages between the local portions 46, 48, 50 of the SIS 100 and the remote portions 52, 54 of the SIS 100 across a long-haul distance, a safety data concentrator (SDC) 128 is disposed within the local environment 12 and communicatively coupled to one or more local portions 46, 48, 50 of the SIS 100, while a safety data de-concentrator (SDD) 130 is disposed within the remote environment 14 and communicatively coupled to one or more remote portions 52, 54 of the SIS 100. In FIG. 1, the SDC 128 is illustrated as being communicatively coupled to the local SIS portions 46, 48, 50 and the SDD is illustrated as being communicatively coupled to the remote SIS portions 52, 54, however, this arrangement is for ease of illustration only. For example, although not shown, any number of local SIS portions may be communicatively connected to the SDC 128, and any number of remote SIS portions may be communicatively connected to the SDD 130. In some embodiments (also not shown), more than one SDC 128 may be disposed in the local environment 12, and respective subsets of local SIS portions may be communicatively coupled to each SDC 128. Similarly, in some embodiments (also not shown), more than one SDD 130 may be disposed in the remote environment 14, and respective subsets of remote SIS portions may be communicatively coupled to each SDD 130.

As shown in FIG. 1, the SDC 128 concentrates individual safety messages that are generated by the local SIS portions 46, 48, and 50 and that are intended to be received by one or more of the remote SIS portion 52, 54 into one or more concentrated safety messages, and transmits the concentrated safety message(s) to the SDD 130 disposed at the remote environment 14 via a long-haul link 132. In the remote environment 14, the SDD 130 recovers the individual safety messages from the concentrated safety message(s) and provides them to their intended recipients, e.g., logic solvers disposed in the remote SIS portion 52 and/or in the remote SIS portion 54. Together, the SDC 128, SDD 130, and long-haul link 132 comprise the long-haul portion 134 (e.g., the long-haul transport mechanism 134) of the safety instrumented system 100.

The long-haul transport mechanism 134 interconnects the local environment 12 and the remote environment 14 that are physically and/or geographically distant from each other, e.g., that are situated at significant, long-haul distance from one another. In an embodiment, the geographical distance between any two local environment portions 16, 18, 20 is shorter than the geographical distance between the local environment 12 and the remote environment 14, and the geographical distance between the remote environment portions 22, 24 is shorter than the geographical distance between the local environment 12 and the remote environment 14. In an example configuration, the local environment 12 of the process plant 10 is located on land while the remote environment 14 of the plant 10 is located in water (e.g., off-shore and/or underwater). In another example configuration, the local environment 12 of the plant 10 is located aboveground while the remote environment 14 is located underground. Of course, the foregoing are just a few examples of long-haul configurations of process plants 10, and additional configurations in which the remote environment 14 of the process plant 10 is located or situated remotely from the local environment 12 of the process plant 10 are possible.

Within the local environment 12, the local environment portions 46, 48, 50 of the SIS 100 communicate with one another (e.g., directly at the I/O level, or at some other designated level) via one or more safety system data highways, buses, and/or rings (which are also referred to interchangeably herein as "safety system communication links") that are disposed within the local environment 12. Similarly, within the remote environment 14, the remote environment portions 52, 54 of the SIS communicate with one another (e.g., directly at the I/O level, or at some other designated level) via one or more safety system communication links that are disposed within the remote environment 14. Additionally, as illustrated in FIG. 1, each SIS portion and its corresponding PCS portion within a particular environment 12, 14 are communicatively connected with one another via the one or more resident safety system communication links (e.g., at the I/O level or at some other designated level) of the particular environment 12, 14. Accordingly, each SIS portion obtains signals and/or messages from its corresponding PCS portion and from other locally situated SIS portions via said resident safety system communication link(s). For example, SIS portion 52 is communicatively connected to PCS portion 42 via one or more safety system communication links disposed in the remote environment 14, and thereby obtains signals and/or messages from the PCS portion 42 via said safety system communication link(s).

Further, within the local environment 12, safety messages generated by one or more local SIS portions 46, 48, 50 are delivered to the SDC 128 via the one or more resident safety system communication links of the local environment 12, e.g., at the I/O level or at some other designated level that is natively utilized by the local SIS portions 46, 48, 50 for communicating safety messages. Similarly, within the remote environment 14, safety messages recovered by the SDD 130 are delivered to one or more remote SIS portions 52, 54 via the one or more resident safety system communication links of the remote environment 14, e.g., at the I/O level or at some other designated level that is natively utilized by the remote SIS portions 52, 54 for communicating safety messages. For example, as illustrated in FIG. 1, local SIS portion 50 is communicatively connected to the SDC 128 via the one or more safety system communication links utilized by local SIS portions 46, 48, 50, and the SDD 130 is communicatively connected to the SDD 130 via the one or more safety system communication links utilized by remote SIS portions 52, 54. The interconnection of the local SIS portion 50 and the SDC 128 and the interconnection of the SDD 130 and remote SIS portion 52 are described in more detail in later section.

Still further, as discussed above, various PCS portions within a particular environment 12, 14 communicate with one another using one or more suitable, resident process control communication data highways, buses, and/or networks (also referred to interchangeably herein as "process control communication links") disposed within the particular environment 12, 14. Generally speaking, process control communication links that are entirely disposed within a particular environment 12, 14 of the PCS 110 may be wired or wireless, and typically (but not necessarily) are different communication links than the safety system communication links of the SIS 110 that supports the PCS 100

On the other hand, the SDC 128 and the SDD 130 transmit and receive concentrated safety messages therebetween using the long-haul link 132 spanning the distance between the local environment 12 and the remote environment 14. In an embodiment, the long-haul link 132 is a lower-bandwidth or otherwise "slower" transport link as compared to a satellite or other high-bandwidth link. For example, the long-haul link 132 may be implemented using one or more non-satellite terrestrial wireless links, one or more links that are piggy-backed onto wired communication links, one or more lower bandwidth VPNs included in one or more overall higher bandwidth links, and/or any other suitable low-bandwidth long-haul link. Generally, the long-haul link 132 is a slower or lower-bandwidth link as compared to the local safety system communication links interconnecting the local SIS portions 46, 48, 50 and the local safety system communication links interconnecting the remote SIS portions 52, 54, and the long-haul link 132 is a slower or lower-bandwidth link as compared to a satellite link or optical fiber link. Advantageously, such slower or lower-bandwidth links are typically less expensive to operate and/or use than a higher-bandwidth link. Typically, communications sent between the SDC 128 and the SDD 130 via the long-haul link 132 are protected via one or more mechanisms or techniques, e.g., authorization, authentication, encryption, keys, and/or other suitable security mechanisms or techniques.

Although FIG. 1 depicts the SDC 128 disposed in the local environment 12 and the SDD 130 disposed in the remote environment 14, in some embodiments, the SDC 128 may be disposed in the remote environment 14 while the SDD 130 is disposed the local environment 12, e.g., when safety-related conditions occurring in the remote environment 14 need to be communicated to devices disposed in the local environment 12. In some embodiments, each of the local environment 12 and the remote environment 14 includes both a respective SDC 128 and a respective SDD 130, and/or includes more than one SDC 128 and/or more than one SDD 130. In such embodiments, the long-haul link 132 may be a bi-directional link, or there may be additional long-haul links for communication between each SDC/SDD pair across long-haul distances. Further, in some implementations, an SDC 128 and SDD 130 disposed within the same environment (e.g., both in the local environment 12, or both in the remote environment 14) may be implemented as an integral device, if desired. Still further, the mapping of SDCs that are disposed in one environment 12, 14 across long-haul distances to SDDs that are disposed in another environment 12, 14 may be one-to-one (as illustrated in FIG. 1), one-to-many, or many-to-one (not shown). Additionally, although only one local environment 12 and one remote environment 14 are shown in FIG. 1, various process plant arrangements may include any number of local environments and any number of remote environments.

Figure 2A:
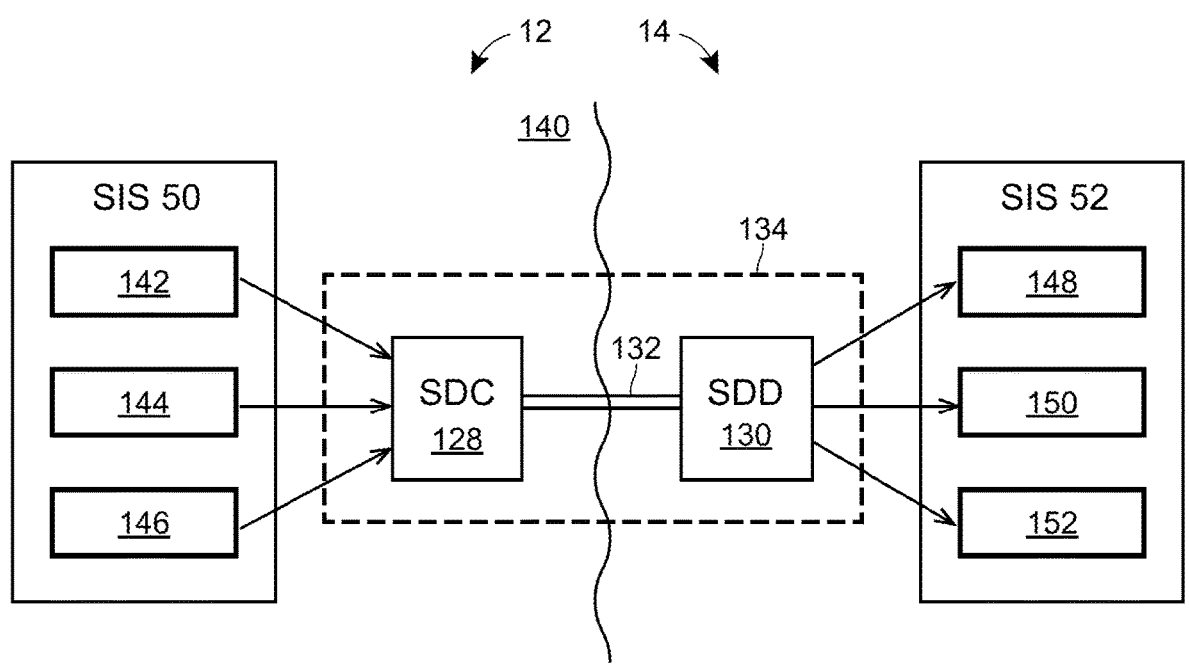
FIGS. 2A-2D depict respective detailed block diagrams of embodiments of the exemplary long-haul safety instrumented system of FIG. 1.

FIG. 2A depicts a block diagram of an embodiment 140 of a portion of the safety instrumented system (SIS) 100 of FIG. 1. In the example embodiment 140 of FIG. 2A, one or more portions of the SIS 100 that are disposed in the local environment 12 include one or more safety logic solvers 142, 144, 146 that generate safety messages which are to be delivered to one or more safety logic solvers 148, 150, 152 of the SIS 100 that are disposed in the remote environment 14. For ease of discussion, FIG. 2A illustrates the local logic solvers 142, 144, 146 as being included in the local SIS portion 50, however, in other embodiments, the local logic solvers 142, 144, 146 may be included in another local SIS portion 46, 48, or may be disposed across two or more local portions 46, 48, 50 of the SIS 100. Similarly, FIG. 2A illustrates the remote logic solvers 148, 150, 152 as being included in the remote SIS portion 52, however, the remote logic solvers 148, 150, 152 may be disposed in the remote SIS portion 54 or across both remote portions 52, 54 of the SIS 100. In an illustrative example scenario, various safety-related conditions may be detected by the local logic solvers 142, 144, 146 (e.g., by receiving or obtaining one or more messages and/or signals via a local safety data highway and/or a local PCS data highway), some of which may cause a respective safety message to be generated by the one or more local logic solvers 142, 144, 146 for delivery to one or more recipient remote logic solvers 148, 150, 152 that are remotely disposed at a long-haul distance from the local logic solvers 142, 144, 146.

Accordingly, the safety messages generated by the local safety logic solvers 142, 144, 146 and destined for one or more of the remote safety logic solvers 148, 150, 152 are transported from the local environment 12 to the remote environment 14 via the long-haul portion 134 of the SIS 100. In particular, as depicted in FIG. 2A, safety messages generated by the local logic solvers 142, 144, 146 are delivered via the SDC 128, the long-haul link 132, and the SDD 130 to the intended, recipient remote logic solvers 148, 150, 152. However, and notably, the actual transport mechanism utilized to deliver the safety messages to their respective recipient(s) (e.g., the long-haul delivery portion 134 of the SIS 100, or a local transport mechanism such as a local safety data highway, bus, or ring), may be transparent to the logic solvers 142, 144, 146, 148, 150, 152. In an example, "sender" logic solvers are ignorant of whether "recipient" logic solvers are locally or remotely located with respect to the sender logic solvers. Accordingly, sender logic solvers simply address safety messages to the respective, intended recipient logic solvers and transmit the messages in the same manner irrespective of whether the recipient logic solvers are locally or remotely situated. For example, a sending logic solver may generate and transmit safety messages to another logic solver at the I/O level (or at some other level and/or format of communication) irrespective whether the recipient logic solver is locally or remotely situated. Specifically, the sender local logic solvers 142, 144, 146 need not provide any indication (e.g., an address, a wrapper, or other indication) that generated safety messages are or are not to be transmitted via the SDC 128. That is, an address or other indication of the SDC 128 need not be indicated in the safety messages that are generated by the sender logic solvers 142, 144, 146.

The SDC 128 serves as a gateway or way station at which the plurality of the safety messages that are generated by the sender safety logic solvers 142, 144, 146 (and optionally, by other local, sender safety logic solvers) and that are destined for remotely-located devices are temporarily collected or staged for combining into one or more concentrated safety messages. Combining the plurality of the safety messages into the concentrated safety message(s) may be performed using any suitable technique, for example, compressing, concentrating, consolidating, multiplexing, and/or other suitable types of combining individual messages into a single message. Generally speaking, though, a total length of a concentrated safety message is shorter than a sum of the lengths of the individual safety messages that were combined to form the concentrated safety message. Further, the combining of the plurality of safety messages may be based on one or more criteria. For example, the one or more combining criteria may include at least one characteristic of the lower-bandwidth, long-haul link 132, such as available bandwidth, maximum bandwidth, noise levels, etc. Additionally or alternatively, the one or more combining criteria of the safety messages may include characteristics of the messages themselves, for example, messages that include content which is directed to a particular subject matter, messages that have a common recipient device, a required time of arrival of a message, an urgency of the safety information contained in the message, a priority of the safety information contained in the message, a tolerable delay, etc.

Other types of message concentration may be possible. For example, expected heartbeat messages received at the SDC 128 from the logic solvers 142, 144, 146 may not be transmitted across the long-haul link 132, and instead the SDD 130 may automatically and locally generate expected heartbeat messages on behalf of the logic solvers 142, 144, 146 and forward them to their respective recipients. However, if/when heartbeat messages are received at the SDC 128 from the logic solvers 142, 144, 146 in an unexpected pattern from the perspective of the SDC 128 (e.g., unexpected content, missing messages, delayed messages, etc.), the SDC 128 may then generate and transmit, via the long-haul link 132, a signal indicative thereof to the SDD 130. Upon reception of said signal, the SDD 130 may cease generating the expected heartbeat messages on behalf of the logic solvers 142, 144, 146, and instead may generate and send safety messages/signals indicative of the unexpected pattern.

At the remote end of the long-haul link 132, the SDD 130 receives a concentrated safety message and recovers the original, individual safety messages therefrom. For example, the SDD 130 may use a recovery technique that is the opposite of or otherwise negates the combining technique utilized by the SDC 128 (e.g., decompression/compression, de-multiplexing/multiplexing, wrapping/unwrapping, etc.). The SDD 130 delivers the recovered safety messages to their intended recipient logic solvers 148, 150, 152 disposed in the remote environment portion 14 of the SIS. For instance, the SDD 130 transmits individual, recovered safety messages at the I/O level, or by using some other level and/or format of communication that is native to their respective recipient safety logic solvers 148, 150, 152. Based upon the receipt and/or contents of the received safety messages, the recipient logic solvers 148, 150, 152 may initiate one or more safety mitigating actions such as sending control messages or signals to effect a trip, open or close a valve, etc. Similar to the local safety logic solvers 142, 144, 146, the remote safety logic solvers 148, 150, 152 may be ignorant of the presence of the long-haul transport mechanism 134 included in the SIS 100, and/or may not even be aware that the received safety messages were delivered via the long-haul transport mechanism 134.

Thus, in light of the above discussion, the transport mechanism that is used to deliver different safety messages is not required to be known by the safety logic solvers 142, 144, 146, 148, 150, 152. That is, the safety logic solvers 142, 144, 146, 148, 150, 152 may be ignorant as to whether a safety message is to be delivered via the long-haul transport mechanism 134 or via a local safety data highway, bus, or ring. In fact, as discussed above, the safety logic solvers 142, 144, 146, 148, 150, 152 may not even be aware of the existence of the long-haul transport mechanism 134. As such, the long-haul transport mechanism 134 (e.g., including the SDC 128, long-haul link 132, and paired SDD 130) may function within the SIS 100 as a logical pipe that interconnects the local 12 and remote 14 environments of the SIS 100. Consequently, an SDC 128/SDD 130 pair and corresponding long-haul link 132 are able to be seamlessly integrated into existing local 12 and remote 14 environments of the SIS 100 of a process control plant 10 without affecting or even notifying any embedded safety logic solvers 142, 144, 146, 148, 150, 152.

Figure 2B:
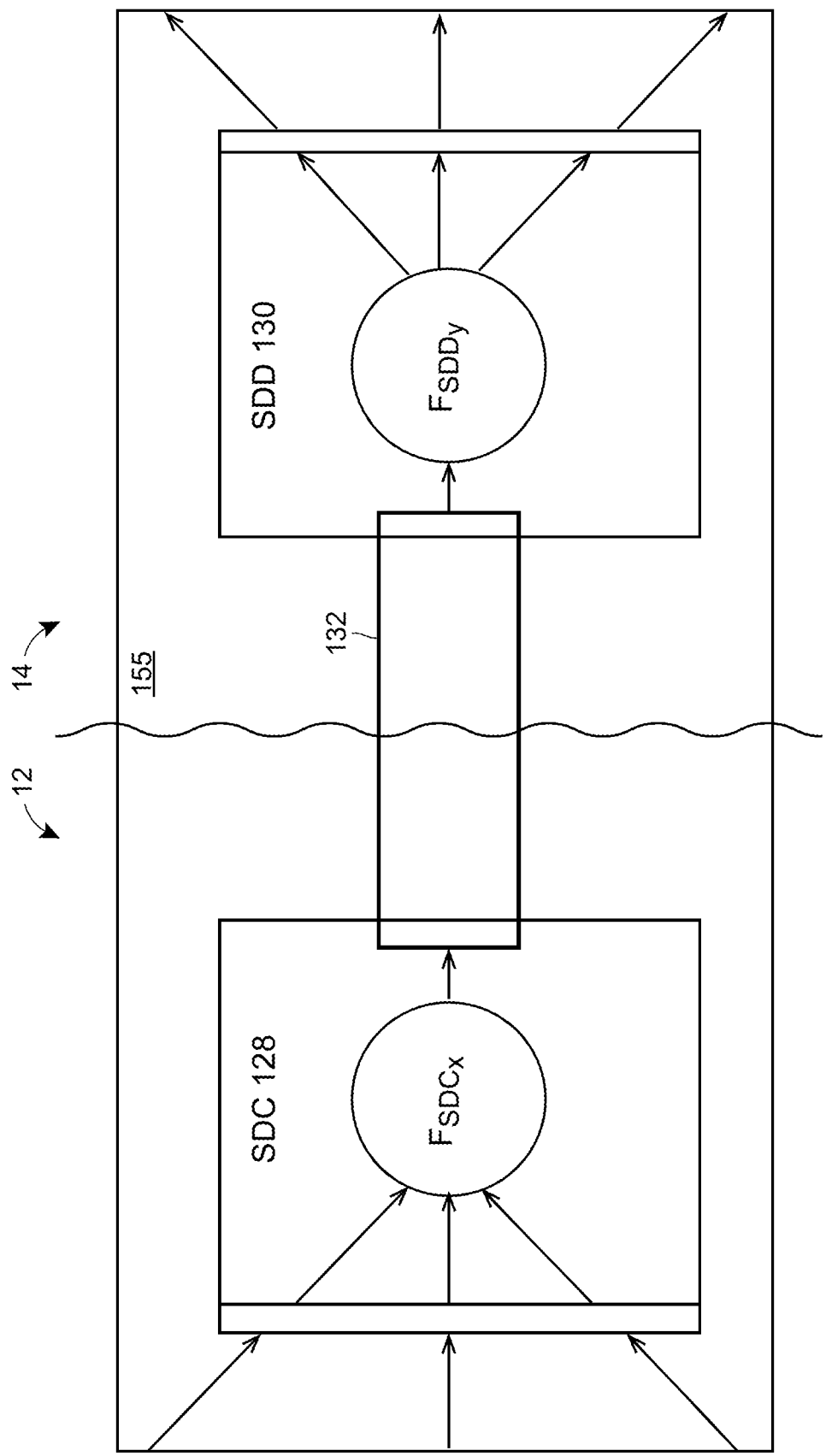

Turning now to FIG. 2B, in an example embodiment 155 of the long-haul portion 134 of the SIS 100, the SDC 128 includes one or more internal functions $F_{SDCx}$. The one or more internal functions $F_{SDCx}$ determine which safety messages from the safety logic solvers 142, 144, 146 are to be combined with one another, when safety messages are to be combined, and when concentrated safety messages are to be transmitted and/or provided for transport over the long-haul link 132 by the SDC 128. The one or more internal functions $F_{SDCx}$ make these determinations based on one or more factors and/or inputs such as, for example, the content of each safety message, the timing of the safety messages, the urgency of each safety message, the safety logic solver from which each safety message originates or a particular combination of safety logic solvers from which a set of safety messages originate, the number of safety messages received, the number of safety messages received from each particular safety logic solver, the frequency of safety messages received, expected safety messages that are not received (e.g., "heartbeat" messages), etc., or some combination of these factors and/or inputs.

In an example implementation, the one or more internal functions $F_{SDCx}$ determine that several individual safety messages are to be combined into a concentrated safety message based on the content of each individual safety message. In some scenarios, individual safety messages that are each related to the same field device or the same type of field device are combined. Additionally or alternatively, in some scenarios, individual safety messages related to a particular location or unit of the plant are combined. Moreover, in some scenarios, safety messages that are related to a particular condition in the plant, such as an overflow, are combined, and/or individual safety messages that are to be received at the same safety logic solver are combined into a concentrated safety message.

In an example implementation, the one or more internal functions $F_{SDCx}$ determine that several individual safety messages are to be combined into a concentrated safety message based on the timing of the receptions of the individual safety messages at the SDC 128. For instance, in some embodiments, individual safety messages that are received by the SDC 128 within a certain period of time are combined. In another example, the one or more internal functions $F_{SDCx}$ determine when to combine individual safety messages, and/or determine when concentrated safety messages should be transmitted and/or provided for transport over the long-haul link 132 based on the timing of the receptions of the individual safety messages at the SDC 128. For instance, in some embodiments, a concentrated safety message made from combining individual safety messages received by the SDC 128 within a certain period of time is, in turn, transmitted to the SDD 130 at a particular time.

Additionally or alternatively, in some implementations, the one or more internal functions $F_{SDCx}$ determine that several safety messages are to be combined into a concentrated safety message based on the urgency of each individual safety message. For instance, individual safety messages that are more urgent are combined into one concentrated safety message, while individual safety messages that are less urgent are combined into another concentrated safety message or other concentrated safety messages. Moreover, in some situations, the one or more internal functions $F_{SDCx}$ determine when individual safety messages are to be combined into a concentrated safety message, or when a concentrated safety message is to be transmitted, based on the urgency of the individual safety messages and/or the concentrated safety message. For example, in some embodiments, more urgent individual safety messages are combined into a concentrated safety message at an earlier time, and/or the concentrated safety message containing the more urgent safety messages is transmitted at an earlier time, while less urgent individual safety messages are combined and/or transmitted in a concentrated safety message at a later time.

In some implementations, the one or more internal functions $F_{SDCx}$ determine that individual safety messages are to be combined into a concentrated safety message based on the safety logic solver from which each individual safety message originates or based on a particular combination of safety logic solvers from which a set of individual safety messages originate. For example, in some scenarios, a series of safety messages generated by a particular safety logic solver (e.g., over a certain period of time, or until a threshold number of safety messages are received) are combined into one concentrated safety message. As another example scenario, the individual safety messages generated by safety logic solvers A, B, and C (e.g., over a certain period of time, or until a threshold number of safety messages are received) are combined into one concentrated safety message, while the safety messages generated by safety logic solvers D and E are combined into another concentrated safety message. In additional or alternative scenarios, the one or more internal functions $F_{SDCx}$ determine that individual safety messages are to be combined based on the safety logic solver from which each safety message originates or a particular combination of safety logic solvers from which a set of individual safety messages originate. For instance, when the SDC 128 receives safety messages from particular safety logic solvers (e.g., once the SDC 128 has received a safety message from both safety logic solver A and safety logic solver B), the safety messages are to be combined into a concentrated safety message immediately and/or the concentrated safety message is to be transmitted immediately (or within a certain amount of time).

Furthermore, in some embodiments, the one or more internal functions $F_{SDCx}$ determine that individual safety messages are to be combined into a concentrated safety message based on the number of safety messages received by the SDC 128 and/or the frequency of individual safety messages received by the SDC 128. For example, when the SDC 128 receives a certain threshold number of individual safety messages, or when the SDC 128 receives a certain threshold number of individual safety messages during a certain period of time, the SDC 128 may combine the received safety messages into a concentrated safety message. Similarly, in some scenarios, the one or more internal functions $F_{SDCx}$ determine when the individual safety messages are to be combined and/or when the concentrated safety message is to be transmitted across the long-haul link 132 based on the number of individual safety messages received by the SDC 128 and/or the frequency of individual safety messages received by the SDC 128. For example, upon the SDC 128 receiving a certain threshold number of safety messages, or upon the SDC 128 receiving a certain threshold number of safety messages during a certain period of time, the SDC 128 combines received safety messages into a concentrated safety message and/or transmits the concentrated safety message over the long-haul link 132.

Moreover, in some implementations, the one or more internal functions $F_{SDCx}$ determine that individual safety messages are to be combined based upon whether expected safety messages are received or not (e.g., "heartbeat" messages), or based on whether an expected safety message is received within a certain interval of time. Additionally or alternatively, in some situations, the one or more internal functions $F_{SDCx}$ determine when safety messages are to be combined or transmitted based on expected safety messages that are not received, or based on expected safety messages that are not received within a certain interval of time.

Of course, the above example implementations and scenarios are only a few examples of ways that the one or more internal functions $F_{SDCx}$ determine which safety messages are combined with one another, when to combine the safety messages, and when the concentrated safety message should be transmitted and/or provided for transport over the long-haul link. Further, each of the above example combining implementations and scenarios may be performed by the SIS 100 singly and/or in combination with other combining implementations and scenarios.

Additionally or alternatively, in some embodiments, the SDD 130 includes one or more internal functions $F_{SDDy}$. The one or more internal functions $F_{SDDy}$, upon receiving a combined safety message transmitted over the long-haul link 132, determine how each of the recovered individual safety messages is to be distributed among the receiving safety logic solvers 148, 150, 152. For example, an internal function $F_{SDDy}$ may determine that multiple safety messages that result in the same mitigating action were received at the SDD 130, e.g., in different concentrated messages, and may only deliver one of the duplicate messages to its recipient. In another embodiment, one or more internal functions $F_{SDDy}$ of the SDD 130 may determine that different recipients are to receive a second particular safety message based upon whether or not the second particular safety message was received at the SDD 130 within a particular interval of time after receiving a first particular safety message. Of course, other scenarios that utilize the one or more internal functions $F_{SDDy}$ of the SDD 130 are possible.

Figure 2C:
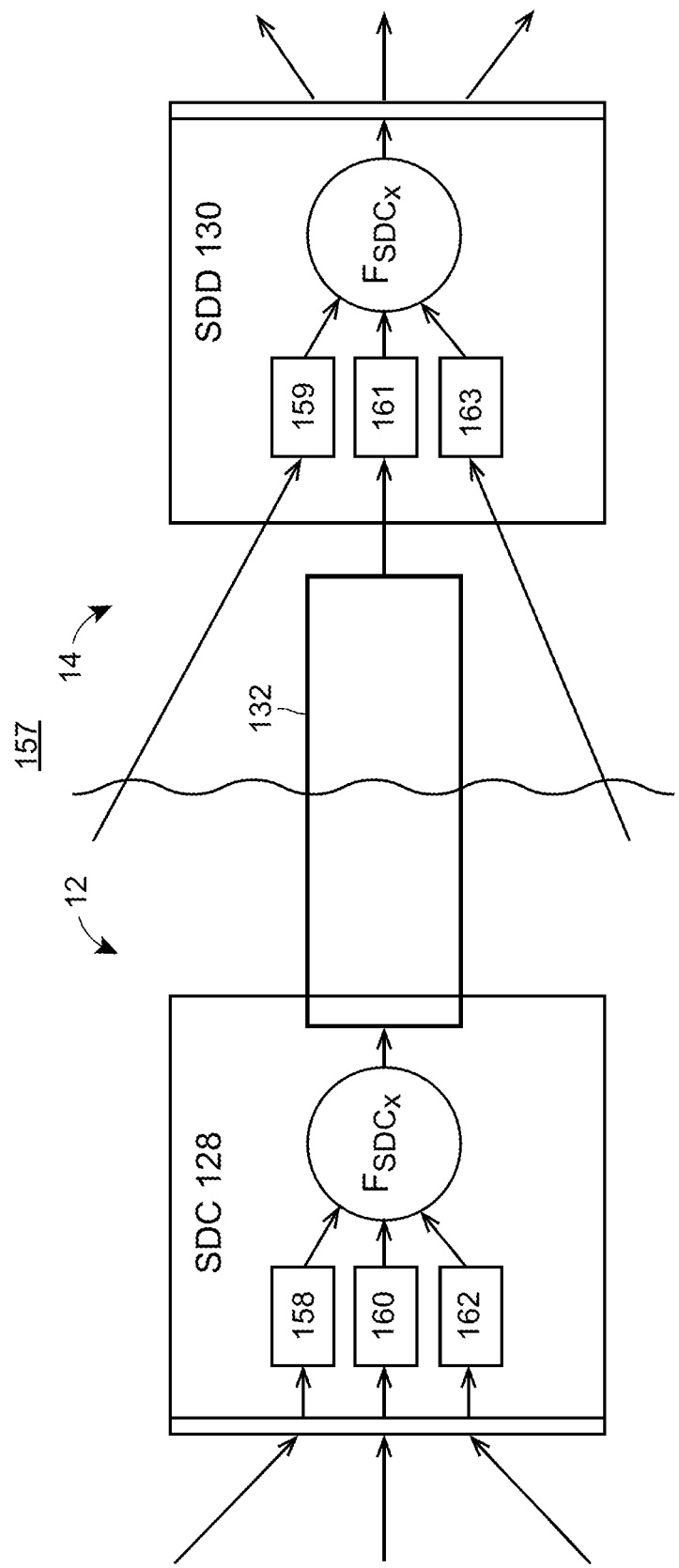

Turning now to FIG. 2C, in an example embodiment 157 of the long-haul portion 134 of the SIS 100, the SDC 128 includes one or more internal logic solvers 158, 160, 162 that handle some of the processing associated with $F_{SDCx}$. The one or more internal logic solvers 158, 160, 162 receive, as input, safety messages and/or signals from other safety logic solvers disposed within the local environment 12 (e.g., the safety logic solvers 142, 144, 146). The internal logic solvers 158, 160, 162 respectively perform safety logic functions corresponding to concentration of safety messages and respectively output or provide a resultant signal (or, in some situations, does not output any signal as a result of its performed safety logic function) that is provided as an input into the one or more functions $F_{SDCx}$. For instance, one or more functions $F_{SDCx}$ included in the SDC 128 may concentrate and/or transmit various concentrated safety messages via the long-haul link 132 based on the threshold conditions, voting on particular conditions, and/or outputs of other logic functions that are indicated or that are not indicated by one or more of the multiple internal logic solvers 158, 160, 162. In one example implementation, the one or more functions $F_{SDCx}$ may determine the contents and/or timing of transmission of various concentrated safety messages that are to be transmitted via the long-haul link 132 based on the absence and/or presence of one or more safety conditions or signals provided by one or more of the internal logic solvers 158, 160, 162. Incorporating internal logic solvers 158, 160, 162 into the SDC 128 may allow for easier configuration and/or changes to local threshold/voting/logic function requirements, e.g., in the local environment 12. Further, this embodiment may be particularly suited for situations in which a single safety data de-concentrator SDD 130 processes signals from multiple instances of safety data concentrators SDC 128. Additionally or alternatively, the use of internal logic solvers 158, 160, 162 may aid in managing bandwidth that is utilized over the long-haul link 132.

Similarly, in some embodiments, the SDD 130 additionally includes one or more internal logic solvers 159, 161, 163, that handle some of the processing associated with $F_{SDDy}$. In an embodiment, each of the internal logic solvers 159, 161, 163 included in the SDD 130 is respectively and communicatively connected to one or more different SDCs 128, e.g., in an arrangement similar to that shown and described with respect to FIG. 2D, and performs respective safety logic functions (e.g., threshold comparison, voting on particular conditions, and/or other types of safety logic functions) based on its received input(s). The resultant output signals (or lack of resultant output signals) are provided as input into the one or more functions $F_{SDDy}$. Based on the absence and/or presence of safety conditions or signals that are provided by the internal logic solvers 159, 161, 163, the one or more functions $F_{SDDy}$ included in the SDD 130 may recover (and/or generate) and deliver individual safety messages to various recipients disposed within the remote environment 14. For example, the one or more functions $F_{SDDy}$ may determine, based on the presence and/or absence of signals/conditions indicated by one or more of the internal logic solvers 159, 161, 163, that one or more individual safety messages are to be distributed to one or more additional receiving safety logic solvers in the remote environment 14, and/or that one or more recovered individual safety messages need not be delivered to their intended recipients (e.g., in the case of duplicates of recovered individual messages from different SDCs 128). The one or more functions $F_{SDDy}$ may distribute individual safety messages to recipient logic solvers based on a combination of types of signals/conditions provided (and/or not provided) by the internal logic solvers 159, 161, 163, based on a timing of conditions/signals that are provided (and/or are not provided) by the internal logic solvers 159, 161, 163, etc.

For still additional flexibility, in some embodiments, additional or alternate internal logic solvers (not shown in FIG. 2C) may be included in the SDD 130 and disposed downstream of at least some of the one or more functions $F_{SDDy}$. As such, such additional or alternate internal logic solvers receive the outputs of the at least some of the one or more functions $F_{SDDy}$, and perform respective logic functions thereon to determine which logic solvers disposed within the remote environment 14 are to receive which individual recovered (and/or generated) safety messages, and when. Incorporating internal logic solvers 158, 160, 162 (and/or additional or alternate internal logic solvers that receive outputs of the one or more functions $F_{SDDy}$) into the SDD 130 may allow for still further easier configuration and/or changes to local threshold/voting/logic function requirements, e.g., in the local environment 12. Further, similar to including internal logic solvers 158, 160, 162 in the SDC 128, including internal logic solvers 159, 161, 163 (and/or including additional internal logic solvers that are disposed downstream of $F_{SDDy}$) in the SDD 130 may be particularly suited for situations in which a single safety data de-concentrator SDD 130 processes signals from multiple instances of safety data concentrators SDC 128. Additionally or alternatively, the use of internal logic solvers 159, 161, 163 (and/or the use of additional internal logic solvers that are disposed downstream of $F_{SDDy}$) in the SDD 130 may aid in managing bandwidth that is utilized for delivering individual safety messages to recipients within the remote environment 14.

In some embodiments, the SDC 128 and/or the SDD 130 themselves respectively detect various safety conditions that cause the SDC 128 and/or the SDD 130 to generate a trip or other type of individual safety message, typically which is delivered to one or more locally disposed logic solvers. For example, upon detection of such conditions, the SDC 128 may deliver or more safety messages to various logic solvers 142, 144, 146 disposed in the local environment 12, and in a similar manner, upon detection of such conditions, the SDD 130 may deliver or more safety messages to various logic solvers 148, 150, 152 disposed in the remote environment 14. Generally speaking, safety conditions that are detected by the SDC 128 and/or by the SDD 130 pertain to the conditions and/or state of the long-haul link 132 interconnecting the pair 128, 130. Examples of such conditions include loss of communication packets (e.g., over a pre-determined interval of time), poor quality of communication packets (e.g., quality below a pre-determined threshold extending over a pre-determined interval of time), a degree of poor quality communication packets (e.g., quality below pre-determined threshold A over X interval of time, quality below pre-determined threshold B over Y interval of time, etc.). The detection of the various safety conditions related to the long-haul link 132 may be implemented in the SDC 128 and/or in the SDC 130 by respective one or more internal functions (e.g., $F_{SDCx}$ and $F_{SDDy}$, respectively), and/or by respective one or more internal logic solvers (e.g., internal logic solvers 158, 160, 162 and/or internal logic solvers 159, 161, 163, respectively). The trips and/or safety messages generated by the SDC 128 and/or by the SDD 130 may be triggered by positive logic (e.g., absence of various conditions) and/or by negative logic (e.g., presence of various conditions, such as when packets arrive and/or include an explicit indicator), as desired.

Figure 2D:
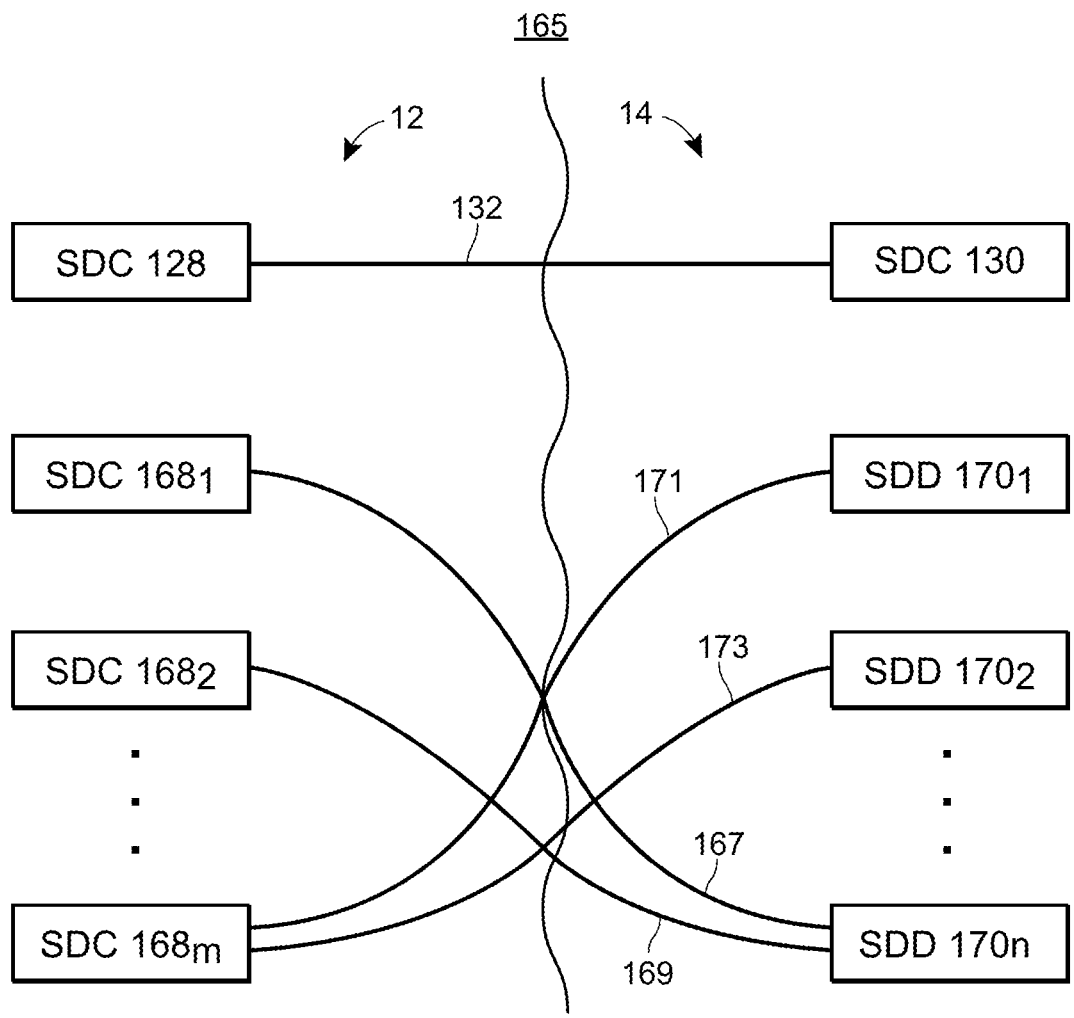

Turning now to FIG. 2D, in an example embodiment 165 of the SIS 100, the SIS 100 may include multiple long-haul links 132, 167, 169, 171, 173 that support multiple instances of SDCs 128, $168_1$-$168_m$ disposed in the local environment 12 and/or that support multiple instances of SDDs 130, $170_1$-$170_n$ disposed in the remote environment 14. The particular pairings of SDCs 128, $168_1$-$168_m$ with SDDs $170_1$-$170_n$ may be one-to-one (e.g., SDC 128 and SDD 130 via long-haul link 132), many-to-one (e.g., SDC $168_1$ and SDD $170_n$ via long-haul link 167, and SDC $168_2$ and SDD $170_n$ via long-haul link 169), and/or one-to-many (e.g., SDC $168_m$ and SDD $170_1$ via long-haul link 171, and SDC $168_m$ and SDD $170_2$ via long-haul link 173). Each instance of the SDCs 128, $168_1$-$168_m$ and each instance of the SDDs 130, $170_1$-$170_n$ may be individually configured in a manner that is similar to, partially similar to, or different than other instances within the SIS 100. For example, each SDC instance 128, $168_1$-$168_m$ may include a respective one or more functions $F_{SDCx}$ and/or a respective one or more internal logic solvers 158, 160, 162. Similarly, each SDD instance may include a respective one or more functions $F_{SDDy}$ and/or a respective one or more internal logic solvers 159, 161, 163 (and/or one or more additional internal logic solvers that are disposed downstream of its respective one or more functions $F_{SDDy}$).

Figure 3:
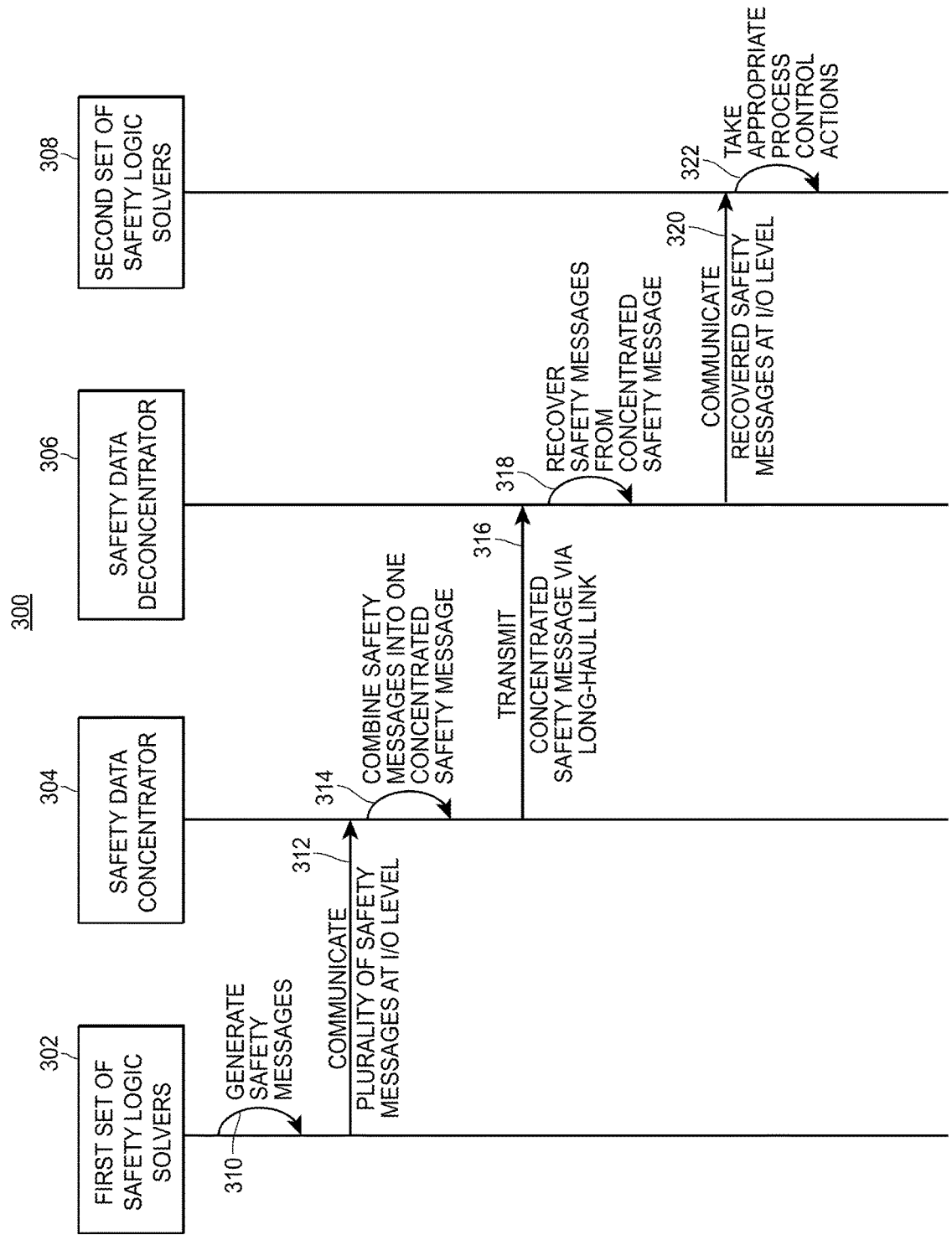
FIG. 3 depicts an example signal diagram associated with an exemplary safety instrumented system included in a process plant that has a long-haul configuration.

FIG. 3 depicts a signal diagram 300 associated with an exemplary long-haul safety instrumented system (SIS) in a long-haul process plant. Referring simultaneously to FIGS. 1 and 2A for ease of illustration and not limitation purposes, the signal diagram 300 includes a first set of safety logic solvers 302 (such as, e.g., safety logic solvers 142, 144, 146), a safety data concentrator 304 (such as, e.g., SDC 128), a safety data de-concentrator 306 (such as, e.g., SDD 130), and a second set of safety logic solvers 308 (such as, e.g., safety logic solvers 148, 150, 152). The first set of safety logic solvers 302 correspond to a first portion (e.g., the portion 50 of the SIS corresponding to local environment 12) of a process plant (e.g., process plant 10), while the second set of safety logic solvers 308 are correspond to a second, remote portion (e.g., the portion 52 of the SIS corresponding to remote environment 14) of the process plant 10, for example.

In the signal diagram 300, the first set of safety logic solvers 302 generates (310) a plurality of safety messages (e.g., based on safety conditions detected in the plant). The safety logic solvers 302 communicate (312) the plurality of safety messages to the SDC 304, e.g., directly at the I/O level. That is, the safety logic solvers 302 communicate the plurality of safety messages to the SDC in the same way that the safety logic solvers 302 communicate with one another within the local environment 12. Next, the SDC 304 combines (314) the plurality of safety messages into one concentrated safety message. Moreover, the SDC 304 transmits (316) the concentrated safety message to the SDD 306 via a long haul link (e.g., long-haul link 132). The SDD 306 recovers (318) the plurality of safety messages from the concentrated safety message. Additionally, the SDD 306 communicates (320) the recovered plurality of safety messages to the second set of safety logic solvers 308, e.g., directly at the I/O level. Accordingly, the second set of safety logic solvers 308 take (322) appropriate process control/mitigating actions based on the recovered plurality of safety messages. Of course, the signal diagram 300 is only exemplary, and additional or alternative means of transmitting data may be implemented in additional or alternative embodiments.

Figure 4A:
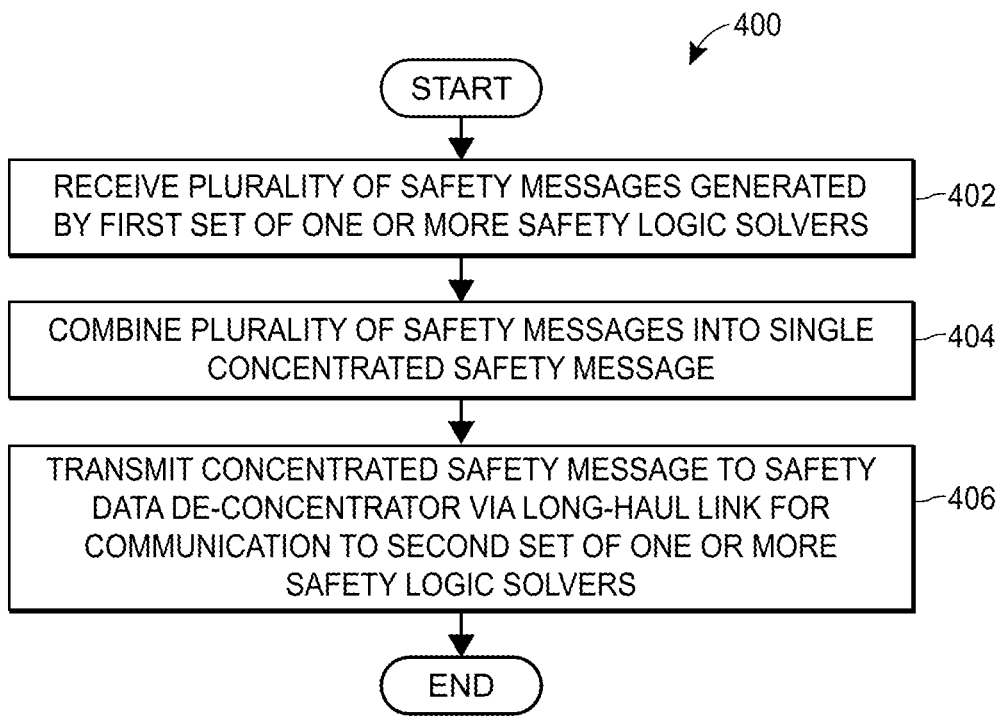
FIG. 4A depicts a flow diagram of an exemplary method for use in a process control system or plant that includes a long-haul configuration.

FIG. 4A depicts a flow diagram of an exemplary method 400 for use in a long-haul process plant (such as, e.g., process plant 10). In some embodiments, the method 400 is performed by a safety data concentrator (e.g., SDC 128 and/or SDC 304) of a safety instrumented system (e.g., SIS 100). Generally speaking, the method 400 may operate in conjunction with embodiments of the systems (and portions thereof) depicted in FIGS. 1 and 2A-2D or other systems, and/or in concert with signaling diagram 300 of FIG. 3, and the method 400 is discussed below with simultaneous reference thereto for illustrative (and not limiting) purposes.

At block 402, a plurality of safety messages generated by the first set of one or more safety logic solvers (e.g., safety logic solvers 142, 144, 146 or 302) is received, e.g., by the SDC 128 and/or SDC 304. The first set of safety logic solvers are communicatively connected with (and thereby receive signals or messages from and/or pertaining to) a first set of process control devices, where the first set of process control devices may include, for example, other safety logic solvers or controllers, safety field devices, process control field devices, process control controllers, etc. Generally speaking, the first set of one or more safety logic solvers and the first set of process control devices are locally disposed in a same environment.

At block 404, the plurality of safety messages is combined into a single concentrated safety message, e.g., by the SDC 128 and/or SDC 304. Combining the plurality of safety messages includes, for instance, compressing, concentrating, consolidating, multiplexing, and/or any other suitable type of combination of the safety messages. In some embodiments, the plurality of safety messages are combined into the single concentrated safety message based on an expected time of transmission of the concentrated safety message. For example, multiple safety messages with the same expected time of transmission are combined into a single concentrated safety message.

In certain embodiments or instances, the plurality of safety messages combined into the single concentrated safety message is generated by one particular safety logic solver. In other embodiments or instances, the plurality of safety messages combined into the single concentrated safety message is generated by more than one safety logic solver. Additionally, in some embodiments or instances, a plurality of different types of safety messages are combined into the single concentrated safety message, while in other embodiments or instances, a plurality of one particular type of safety message are combined into the single concentrated safety message. Other criteria for combining safety messages may include criteria such as previously discussed elsewhere herein, and/or other desired criteria. Evaluation of criteria for combining may be performed, for example, by one or more internal functions $F_{SDCx}$ included in the SDC, for example.

At block 406, the concentrated safety message is transmitted (e.g., by the SDC 128 and/or SDC 304) to a safety data de-concentrator (e.g., SDD 130 and/or SDD 306) via a long-haul link (e.g., long-haul link 132). The long-haul link is, for instance, a wired communication mechanism, a lower bandwidth VPN within a higher bandwidth link, an optical fiber link, an undersea cable, a long range wireless link, or any other suitable low-bandwidth long-haul link. The long-haul link connects the first portion of the SIS (e.g., portion 46, 48, and/or 50) to a second portion (e.g., portion 52 and/or 54) of the SIS (e.g., SIS 100). In some embodiments, the second portion of the SIS is geographically remote from the first portion of the SIS. For instance, the long-haul process plant can include an oil pipeline, an offshore platform, a remote wellhead, etc., remote from other portions of the process plant. In such instances, the first portion of the SIS is located above ground, while the second portion is located underground, for instance. As another example, the first portion of the SIS can be located on land, while the second portion is located in water or under water. As still another example, the first portion of the SIS can be located in a part of the process plant that is geographically remote from the location of the second portion.

The SDD corresponds to the second portion of the SIS, and is configured to receive the transmitted concentrated safety message, recover the plurality of safety messages therefrom, and subsequently communicate the recovered messages to the second set of safety logic solvers (e.g., safety logic solvers 148, 150, 152, or 308). The second set of safety logic solvers are disposed in the second portion of the SIS, and are in turn in operative communication with (and thereby are able to transmit or send messages/signals to) a second set of process control devices of the process control system. The second set of process control devices is disposed in the second portion of the SIS as well, and may include, for example, other safety logic solvers or controllers, safety field devices, process control field devices, process control controllers, etc.

In some embodiments, the single concentrated safety message is transmitted across the long-haul link based on one or more safety conditions indicated by at least one of the plurality of safety messages. In other embodiments, the single concentrated safety message is transmitted across the long-haul link based on an output of a threshold logic comparator applied to one or more of the plurality of safety messages. In still other embodiments, the single concentrated safety message is transmitted across the long-haul link based on an output of a logic evaluator applied to one or more of the plurality of safety messages. Additionally or alternatively, in still other embodiments, the single concentrated safety message is transmitted across the long-haul link based on the absence or presence of a particular safety message in the plurality of safety messages. In still other embodiments, the single concentrated safety message is transmitted across the long-haul link based on the content of one or more of the plurality of safety messages. Of course, in some embodiments, the single concentrated safety message is transmitted across the long-haul link based on multiple of the foregoing factors or outputs described herein, and/or based on factors or outputs not listed. In an embodiment, one or more safety logic solvers included in the SDC include threshold comparators, voting logic evaluators, and/or other mechanisms and/or techniques for determining logic functions related to safety messages and/or conditions to process the factors and generate the outputs.

In some embodiments, the single concentrated safety message is transmitted to a plurality of SDDs, e.g., via one or more long-haul links. For instance, the single concentrated safety message may be transmitted to additional SDDs in various portions of the SIS, and, in some embodiments, to different remotely situated, long-haul portions. Additionally, in some embodiments, a plurality of concentrated safety messages is transmitted to one or more SDDs, which may be disposed in a same remote, long-haul portion, or across several remote, long-haul portions.

In some embodiments, safety messages are additionally transmitted between portions of the SIS via a local link, distinct from the long-haul link. The other link is generally a link configured to connect portions of the SIS that are proximate to one another. That is, while the long-haul link connects portions of the SIS that are remote (geographically or otherwise) from one another, the second link connects portions of the SIS that are relatively close to one another (e.g., that are locally disposed). In some embodiments, the link connecting the portions of the SIS that are proximate to one another is a higher bandwidth link, while the long-haul link is a lower bandwidth link.

Figure 4B:
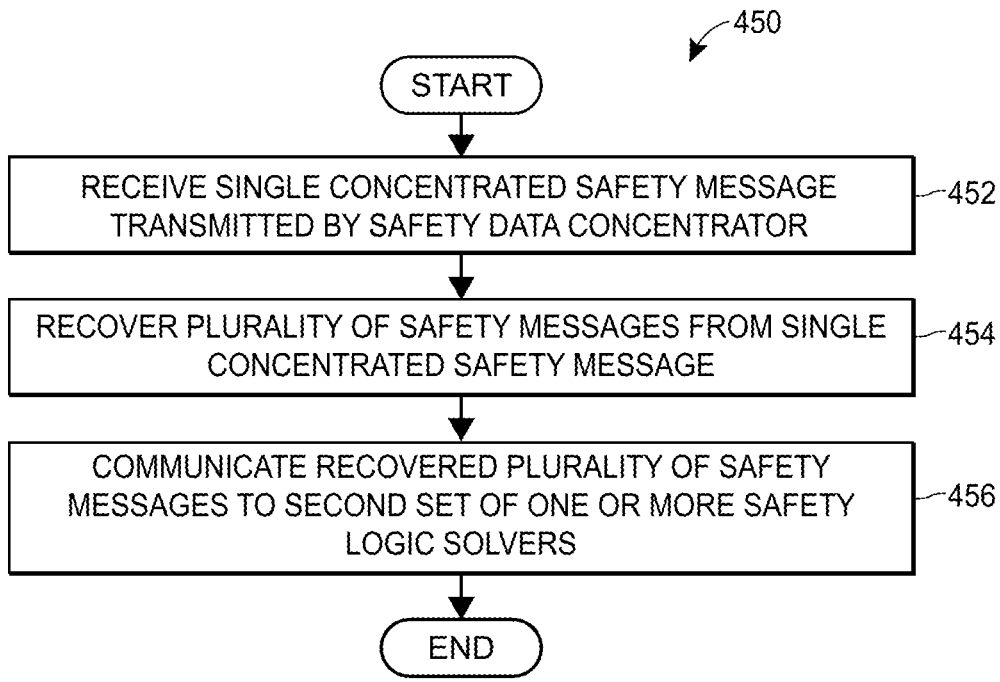
FIG. 4B depicts a flow diagram of an exemplary method for use in a process control system or plant that includes a long-haul configuration.

FIG. 4B depicts a flow diagram of an exemplary method 450 for use in a long-haul process plant (e.g., process plant 10). In some embodiments, the method is performed by a safety data de-concentrator (e.g., SDD 130 and/or SDD 306) of a safety instrumented system (e.g., SIS 100). Generally speaking, the method 450 may operate in conjunction with embodiments of the systems (and portions thereof) depicted in FIGS. 1 and 2A-2D or other systems, and/or in concert with signaling diagram 300 of FIG. 3. In some embodiments, the method 450 may operate in conjunction with at least a portion of the method 400.

At block 452, a single concentrated safety message transmitted by a safety data concentrator (e.g., SDC 128 and/or SDC 304) is received via a long-haul link, e.g., by the SDD 130 and/or SDD 306. The SDC from which the concentrated safety message is received corresponds to a first portion (e.g., portion 50) of an SIS, and is communicatively connected to a first set of one or more safety logic solvers (e.g., safety logic solvers 142, 144, 146, or 302). The safety logic solvers also correspond to the first portion of the SIS. The safety logic solvers are additionally in operative communication with (and thereby receive signals or messages from and/or pertaining to) a first set of process control devices, where the first set of process control devices may include, for example, other safety logic solvers or controllers, safety field devices, process control field devices, process control controllers, etc. of the process control system. The first set of process control devices is generally disposed at the first portion of the SIS 100. Moreover, the SDC is configured to combine pluralities of safety messages generated by the first set of safety logic solvers into concentrated safety messages, and to transmit the concentrated safety messages to the SDD via the long-haul link. In some embodiments, concentrated safety messages transmitted by multiple SDCs of similar configurations (i.e., at other portions of the SIS) are received. The concentrated safety message is transmitted and received via a long-haul link (e.g., long-haul link 132), such as, e.g., a wired communication mechanism, a lower bandwidth VPN within a higher bandwidth link, an optical fiber link, an undersea cable, a long range wireless link, or any other suitable low-bandwidth long-haul link configured to transmit and/or receive concentrated safety messages from various portions of a SIS.

In some instances, the SDC combines a plurality of safety messages generated by one safety logic solver, while in other instances, the SDC combines safety messages generated by more than one of the safety logic solvers. Similarly, in some configurations, the SDC combines a plurality of different types of safety messages into a single concentrated message, while in other configurations the SDC combines a plurality of similar types of safety messages into the single concentrated message. In some embodiments, the SDC combines a plurality of safety messages generated by the first set of safety logic solvers into a concentrated safety message based on an expected time of transmission of the concentrated safety messages. Of course, in some embodiments, these various configurations are combined.

Additionally, the concentrated safety message is transmitted based on one or more safety conditions indicated by at least one of the plurality of safety messages. In some embodiments, the concentrated safety message is transmitted based on the output of a threshold logic comparator applied to one or more of the plurality of safety messages. In other configurations, the concentrated safety message is transmitted based on an output of a logic evaluator (e.g., threshold evaluator, voting evaluator, and/or other safety function evaluator) applied to one or more of the plurality of safety messages. In additional or alternative embodiments, the concentrated safety message is transmitted based on the absence or presence of a particular safety message in the plurality of safety messages combined. In other embodiments, the concentrated safety message is transmitted based on the content of one or more of the plurality of safety messages.

The SDD is communicatively connected to a second set of safety logic solvers (e.g., safety logic solvers 148, 150, 152, or 308). The second set of safety logic solvers corresponds to a second portion (e.g., portion 52) of the SIS, and is in operative communication with (and thereby are able to transmit or send messages/signals to) a second set of one or more process control devices (e.g., safety system field devices) of the process control system. The second set of process control devices is generally disposed at the second portion of the SIS, and may include, for example, other safety logic solvers or controllers, safety field devices, process control field devices, process control controllers, etc....

At block 454, a plurality of safety messages is recovered from the single concentrated safety message, e.g., by the SDD 130 and/or SDD 306, and at block 456, the recovered plurality of safety messages are communicated, e.g., by the SDD 130 and/or SDD 306, to respective intended recipients included in the second set of safety logic solvers. Generally speaking, the intended recipients are included in the second set of process control devices to which the second set of logic solvers is communicatively connected. In some embodiments, the recovered safety messages are communicated to the second set of safety logic solvers based on one or more safety conditions indicated by one or more of the recovered safety messages.

In other embodiments, the recovered safety messages are communicated to the second set of safety logic solvers based on an output of a threshold logic comparator applied to one or more of the recovered safety messages. In some configurations, the recovered safety messages are communicated to the second set of safety logic solvers based on an output of a logic evaluator (e.g., threshold evaluator, voting evaluator, and/or other safety function evaluator) applied to one or more of the recovered safety messages. In additional or alternative configurations, the recovered safety messages are communicated to the second set of safety logic solvers based on the absence or presence of a particular safety message in the recovered safety messages. In still other embodiments, the recovered safety messages are communicated to the second set of safety logic solvers based on the content of one or more of the recovered safety messages. In certain instances, particular recovered safety messages are communicated only to particular safety logic solvers, while other recovered safety messages are communicated to other safety logic solvers. In other instances, of course, all recovered safety messages are communicated to all safety logic solvers. Of course, received and recovered safety messages may be transmitted to various recipients based on one or more of the multiple factors described herein, and/or based on other factors. In an embodiment, one or more safety logic solvers are included in the SDD, e.g., threshold comparators, voting logic evaluators, and/or other safety logic function mechanisms for determining safety logic related to delivering safety messages locally to various recipients.

In some embodiments, safety messages are additionally transmitted via a second link between remotely-situated portions of the SIS. In some embodiments, the second link (e.g., a satellite link, a fiber optic link, etc.) has a higher bandwidth than the long-haul link. The second link may be used to transmit safety messages whose receipt is more time-critical, for example. Additionally, in some embodiments, the safety messages transmitted via the second link are not concentrated.

Figure 5A:
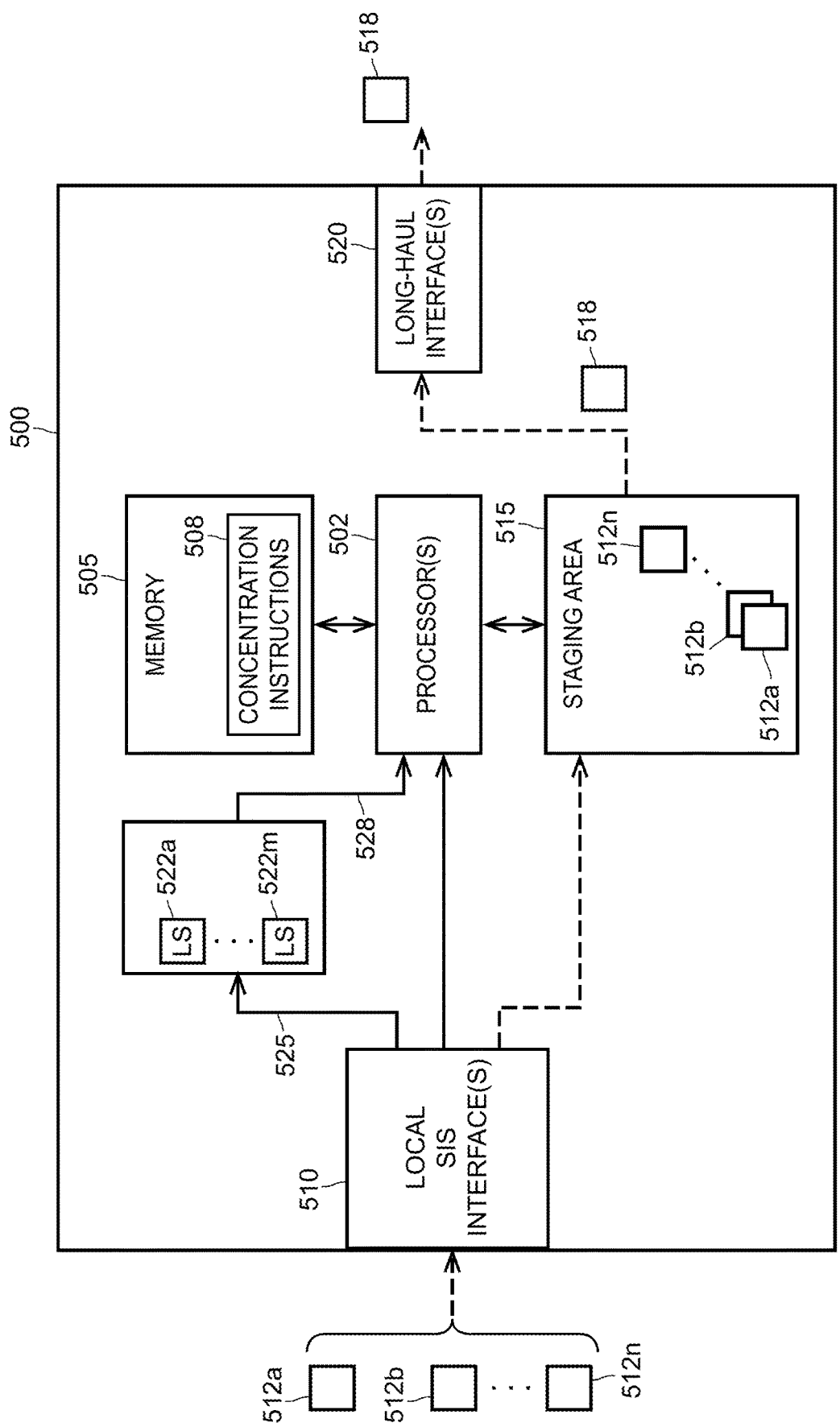
FIG. 5A depicts a block diagram of an example safety data concentrator (SDC)

FIG. 5A depicts a block diagram of an example safety data concentrator (SDC) 500, which may be included in the safety instrumented system of FIG. 1 and embodiments thereof described herein, such as those described in conjunction with FIGS. 2A-2D and/or FIG. 3. Additionally or alternatively, the safety data concentrator 500 may be utilized to perform embodiments of the method 400 and/or the method 450 of FIGS. 4A and 4B, respectively. For ease of discussion, and not for limitation purposes, FIG. 5A is described below with simultaneous reference to FIGS. 1 and 2A-2D.

As shown in FIG. 5A, the SDC 500 includes one or more processors 502 (which, in some implementations, may be multi-core processors) and one or more tangible, non-transitory computer-readable media or memories 505, on which computer-executable instructions 508 for generating and transmitting concentrated safety messages via a long-haul link 132 of a safety instrumented system 100 servicing a long-haul process plant 10 are stored. That is, the computer-executable instructions 508, when executed by the one or more processors 502, cause the SDC 500 to receive or obtain safety messages or signals (e.g., individual safety messages or signals) generated by logic solvers 142, 144, 146 disposed locally within the SIS 100 with respect to the SDC 500, concentrate two or more of the received safety messages into a single, concentrated safety message according to one or more concentration criteria (e.g., such as described above), and transmit the single, concentrated safety message to one or more safety data de-concentrators (SDD) (e.g., one or more of SDDs 130, 170$_1$-170$_n$) via respective long-haul links (e.g., long-haul links 132, 167, 169, 171, 173). Generally speaking, a total length of the generated single, concentrated safety message generated by the SDC 500 is less than the sum of the respective lengths of the local safety messages of which the concentrated safety message is comprised. The computer-executable instructions 508 are referred to herein as concentration instructions 508, and may include or implement one or more internal functions $F_{SDCx}$ that indicate the various criteria based upon which selected local safety messages are or are not to be combined.

The SDC 500 includes one or more local SIS interfaces 510 via which safety messages 512a-512n generated by locally disposed logic solvers (e.g., local logic solvers 142, 144, 146) are obtained. In an example implementation, the one or more local SIS interfaces 510 are communicatively connected to one or more local safety data highways or local safety communication busses via which safety messages are delivered within the portion of the SIS 100 disposed in the local environment 12. For example, the one or more local SIS interfaces 510 may operate at the level at which information is exchanged between various components of the SIS 100, e.g., via I/O cards and/or by using protocols and/or formats supported by I/O cards.

The obtained, locally generated safety messages 512a-512n are staged (e.g. are temporarily stored) by the SDC 500 in a staging area 515. The staging area 515 may be included in the SDC 500 as shown in FIG. 5A, or may be disposed external to and accessible to the SDC 500 (not shown). The staging area 515 may be implemented on the one or more memories 505, or may be implemented on a different set of one or more memories (not shown). In an example configuration, the concentration instructions 508 control the staging of obtained safety messages 512a-512n based on one or more conditions, e.g., not staging duplicate messages, managing memory configuration of the staging area 515 to optimize storage, turning on or off timers associated with various safety messages, clearing or removing safety messages from the staging area 515, etc.

The concentration instructions 508 operate on at least a portion of the staged local safety messages 512a-512n, and combine two or more of the staged safety messages into a single, concentrated safety message 518 in accordance with one or more combination criteria, e.g., based on, for example, the contents of the safety messages, the respective local logic solvers that generated the various safety messages, the respective remote logic solvers that are to be the recipients of the various safety messages, an urgency of the safety messages, an expected timing or time of transmission, a number of received/obtained safety messages, a type of safety message, a frequency of received/obtained safety messages, and/or other suitable combining criteria. Concentrating the two or more staged safety messages into the single, concentrated safety message 518 may utilize any one or more suitable techniques, such as compressing, consolidating, multiplexing, etc., which may be performed on the headers of the staged safety messages and/or on the contents of the staged safety messages.

The SDC 500 includes one or more long-haul link interfaces 520 via which concentrated safety messages 518 are transmitted via respective long-haul links (e.g., long-haul links 132, 167, 169, 171, 173) to respective SDDs. In some implementations, the SDC 500 includes multiple long-haul link interfaces 520 of various types, e.g., to support configurations of the SIS 100 that include multiple types of long-haul links interconnecting the local 12 and remote 14 portions of the SIS 100. For example, the SDC 500 may include a long-haul link interface 520 to a virtual link that is included or contained in a higher bandwidth long-haul link, and may also include a different long-haul link interface 520 to a long range wireless link.

In some embodiments, the SDC 500 includes one or more internal logic solvers 522a-522m. For instance, the one or more internal logic solvers 522a-522m may include one or more of the internal logic solvers 158, 160, 162. In FIG. 5A, the internal logic solvers 522 are illustrated as being disposed downstream of the local SIS interfaces 510 and upstream of the processors 502 and/or of the safety message staging area 515. That is, the internal logic solvers 522 receive messages and/or signals from the local SIS interfaces 510, and deliver output to the processors 502. In some embodiments (not shown), one or more of the internal logic solvers 522 may integrally include a respective, local SIS interface 510.

Each of the internal logic solvers 522 may operate on signals indicative of the obtained, locally generated safety messages or absences thereof (which are collectively represented in FIG. 5A by reference 525), perform respective logic operations thereon (e.g., threshold comparisons, voting functions, etc.), and generate a respective output signal (which are collectively represented in FIG. 5A by reference 528), which is provided to the processors 502. The processors 502 executing the concentration instructions 508 may utilize the output signals 528 as additional input into the combining functions $F_{SDCx}$. For example, based on an output signal of internal logic solver 522, the concentration instructions 508 may cull or delete one or more staged safety messages 512a-512n, may start or stop a timer corresponding to an interval of time for collection of local safety messages, may transmit a single, locally generated safety message without combining it with other safety messages, may generate a new safety message for delivery to one or more remote portions of the SIS via the long-haul interfaces 520, etc.

Figure 5B:
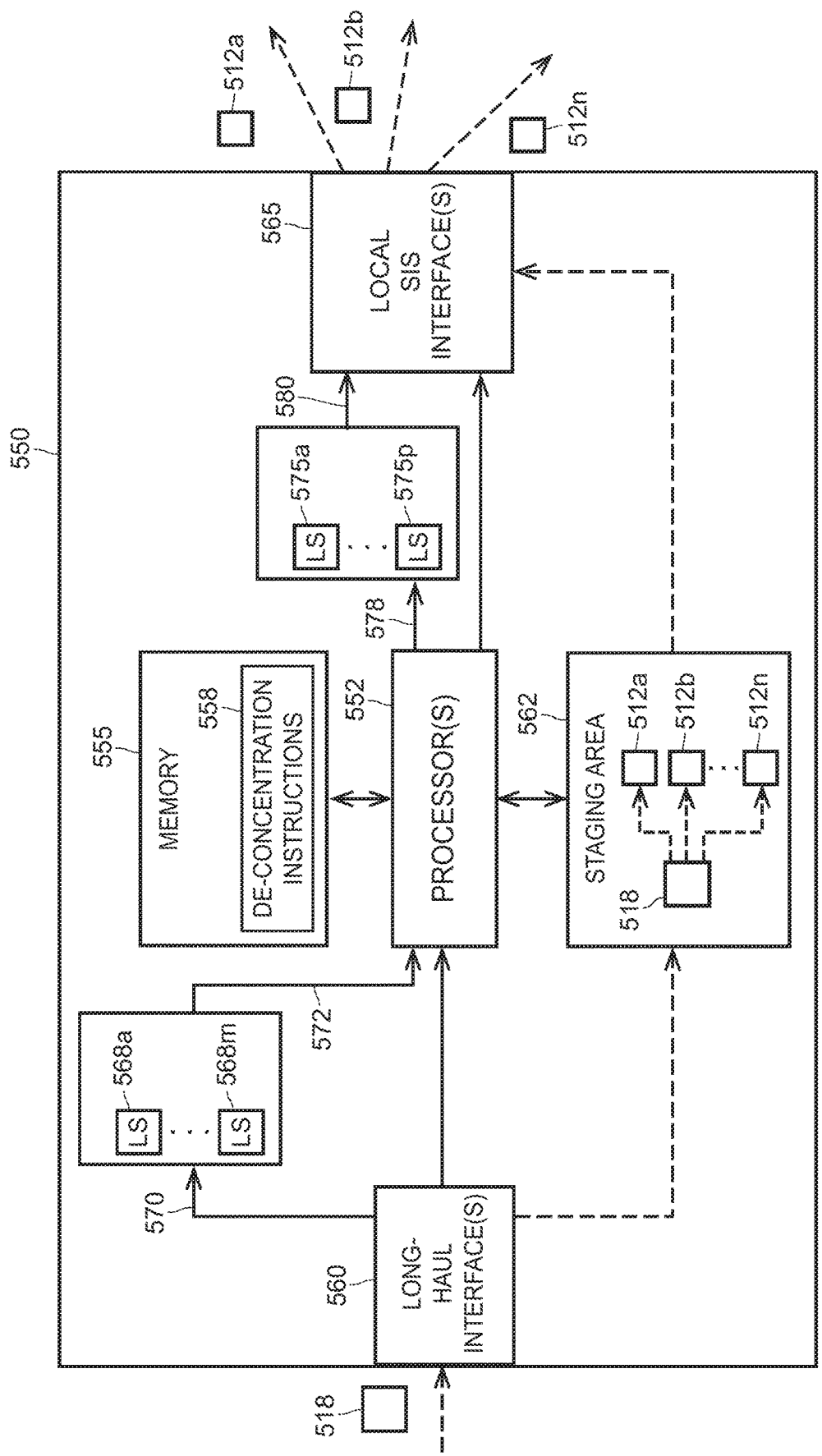
FIG. 5B depicts a block diagram of an example safety data de-concentrator (SDD), each of which may be included in the safety instrumented system of FIG. 1.

FIG. 5B depicts a block diagram of an example safety data de-concentrator (SDD) 550, which may be included in the safety instrumented system of FIG. 1 and embodiments thereof described herein, such as those described in conjunction with FIGS. 2A-2D and/or FIG. 3. Additionally or alternatively, the safety data de-concentrator 550 may be utilized to perform embodiments of the method 400 and/or the method 450 of FIGS. 4A and 4B, respectively. Still additionally or alternatively, the safety data de-concentrator 550 may be utilized in conjunction with the safety data concentrator 500. For ease of discussion, and not for limitation purposes, FIG. 5B is described below with simultaneous reference to FIGS. 1, 2A-2D, and 5B.

As shown in FIG. 5B, the SDD 550 includes one or more processors 552 (which, in some implementations, may be multi-core processors) and one or more tangible, non-transitory computer-readable media or memories 555, on which computer-executable instructions 558 are stored. The computer-executable instructions 558 are executable to recover individual safety messages from concentrated safety messages via a long-haul link 132 of a safety instrumented system 100 servicing a long-haul process plant 10, and deliver the individual safety messages to respective recipients, for example. That is, the computer-executable instructions 558, when executed by the one or more processors 552, cause the SDD 550 to receive a concentrated safety message via a long-haul link 132 of an SIS 100, de-concentrate the concentrated safety message into its individual safety messages (or otherwise recover the individual safety messages from the concentrated safety message), and communicate the recovered safety messages to recipient safety logic solvers disposed locally within the SIS 100 with respect to the SDD 550 (e.g., to logic solvers 148, 150, 152). Generally speaking, a total length of the single, concentrated safety message received or obtained at the SDD 550 is less than the sum of the respective lengths of the individual safety messages of which the concentrated safety message is comprised. The computer-executable instructions 558 are referred to herein as de-concentration instructions 558, and may include or implement one or more internal functions $F_{SDD_y}$ that indicate one or more criteria based upon which selected local safety messages are or are not to be communicated to recipient local safety logic solvers.

The SDD 550 includes one or more long-haul link interfaces 560 via which concentrated safety messages (e.g., concentrated safety message 518 shown in FIG. 5A) are received via respective long-haul links (e.g., long-haul links 132, 167, 169, 171, 173) from respective SDCs, such as the SDCs 128, $168_1$-$168_m$, 500. In some implementations, the SDD 550 includes multiple long-haul link interfaces 560 of various types, e.g., to support configurations of the SIS 100 that include multiple types of long-haul links interconnecting the local 12 and remote 14 portions of the SIS 100. For example, the SDD 550 may include a long-haul link interface 560 to a long-haul link that is piggybacked onto a wired communications link, and also may include a different long-haul link interface 560 to a long range wireless link.

The de-concentration instructions 558 may operate on the received, concentrated safety message 518 to recover the individual safety messages 512a-512n that were combined at the other end of the long-haul link to form the concentrated safety message 518. Recovering the individual safety messages 512a-512n from the single, concentrated safety message 518 may utilize any one or more suitable techniques, such as de-compressing, de-consolidating, de-multiplexing, etc., which may be performed on the header of the concentrated safety message 518 and/or on the content of the concentrated safety message 518. In an embodiment, the de-concentration instructions 558 separate out the individual safety messages from the concentrated safety message 518 by performing an opposite or inverse technique with respect to the combining technique utilized by the respective SDC 500 that generated the concentrated safety message 518 at the transmitting end of the long-haul link.

In an embodiment, the de-concentration instructions 558 may utilize a staging area 562 to stage or temporarily store concentrated safety messages and recovered safety messages. The staging area 562 may be included in the SDD 550 as shown in FIG. 5B, or may be disposed external to and accessible to the SDD 550 (not shown). The staging area 562 may be implemented on the one or more memories 555, or may be implemented on a different set of one or more memories (not shown). In an example configuration, the de-concentration instructions 558 control the delivery of recovered safety messages 512a-512n to locally disposed recipients based on one or more conditions, e.g., not delivering duplicate messages, managing memory configuration of the staging area 562 to optimize storage, turning on or off timers associated with various safety messages, etc.

The SDD 550 includes one or more local SIS interfaces 565 via which recovered safety messages 512a-512n are delivered to their respective, intended locally disposed logic solvers (e.g., to logic solvers 148, 150, 152). In an example implementation, the one or more local SIS interfaces 565 are communicatively connected to one or more local safety data highways or local safety communication busses via which safety messages are delivered within the portion of the SIS 100 disposed in the environment local to the SDD 550. For example, the one or more local SIS interfaces 565 may operate at the level at which information is exchanged between various components of the SIS 100, e.g., via I/O cards and/or by using protocols and/or formats supported by I/O cards.

In some embodiments, the SDD 550 includes a first set of one or more internal logic solvers 568a-568m. For instance, the one or more internal logic solvers 568 may include one or more of the internal logic solvers 159, 161, 163. In an example arrangement, each internal logic solver 568 is respectively and communicatively connected to one or more different SDCs, e.g., in an arrangement similar to that shown and described with respect to FIG. 2D. Each of the internal logic solvers 568 may operate on signals indicative of concentrated safety messages that are received via one or more long-haul links or absences thereof (which are collectively represented in FIG. 5B by reference 570), perform respective logic operations thereon (e.g., threshold comparisons, voting functions, etc.), and generate a respective output signal (which are collectively represented in FIG. 5B by reference 572), which is provided to the processors 552. The processors 552 executing the de-concentration instructions 558 may utilize the output signals 572 as additional input into the recovering functions $F_{SDD_y}$. For example, based on an output signal of an internal logic solver 568, the de-concentration instructions 558 may create a new safety message and communicate the new safety message to one or more recipient, locally disposed logic solvers, may drop or prevent certain recovered individual safety message from being sent to any locally disposed logic solvers, may set or cancel a timer associated with other received concentrated safety messages, may clear or remove a recovered safety message from the staging area 562, etc.

In some embodiments, the SDD 550 additionally or alternatively includes a second set of one or more internal logic solvers 575a-575p. In FIG. 5B, the second set of internal logic solvers 575 are illustrated as being disposed upstream of the local SIS interfaces 565 and downstream of the processors 552 and/or of the safety message staging area 562. That is, the second set of internal logic solvers 575 receive signals 578 from the processors 552 and provide outputs 580 to one or more local SIS interfaces 565. In some embodiments (not shown), one or more of the internal logic solvers 575 may integrally include a respective, local SIS interface 565. Generally speaking, the internal logic solvers 575 receive, from the processors 552, one or more outputs generated by the de-concentration instructions 558 (which are collectively represented in FIG. 5B by reference 578), e.g., that are generated by one or more of the functions $F_{SDD_y}$, and perform respective logic functions thereon (e.g., threshold comparisons, voting functions, etc.). The outputs of the internal logic solvers 575 (which are collectively represented in FIG. 5B by reference 580) may inform the delivery of individual safety messages to recipient, locally disposed safety logic solvers. For example, based on an output signal of an internal logic solver 575, the de-concentration instructions 558 may create a new safety message and communicate the new safety message to one or more recipient, locally disposed logic solvers, may drop or prevent certain recovered individual safety message from being sent to any locally disposed logic solvers, may set or cancel a timer associated with other received concentrated safety messages, may clear or remove a recovered safety message from the staging area 562, etc.

Generally speaking, the first set of internal logic solvers 568 of the SDD 550 operate on signals corresponding to concentrated safety messages that are received via the long-haul link(s) to which the SDD 550 is connected to thereby influence de-concentration techniques, to determine which particular safety messages (e.g., which may be recovered safety messages or newly generated safety messages) are to be communicated to which particular locally-disposed safety logic solvers, to increase efficiencies in communicating safety messages to locally-disposed safety logic solvers, etc. The second set of internal logic solvers 575 of the SDD 550 operate on signals corresponding to outputs of the de-concentrator 558 to determine which particular safety messages (e.g., which may be recovered safety messages or newly generated safety messages) are to be communicated to which particular locally-disposed safety logic solvers, determine when certain safety messages are to be locally communicated, increase efficiencies in communicating safety messages to locally-disposed safety logic solvers, etc.

Figure 6:
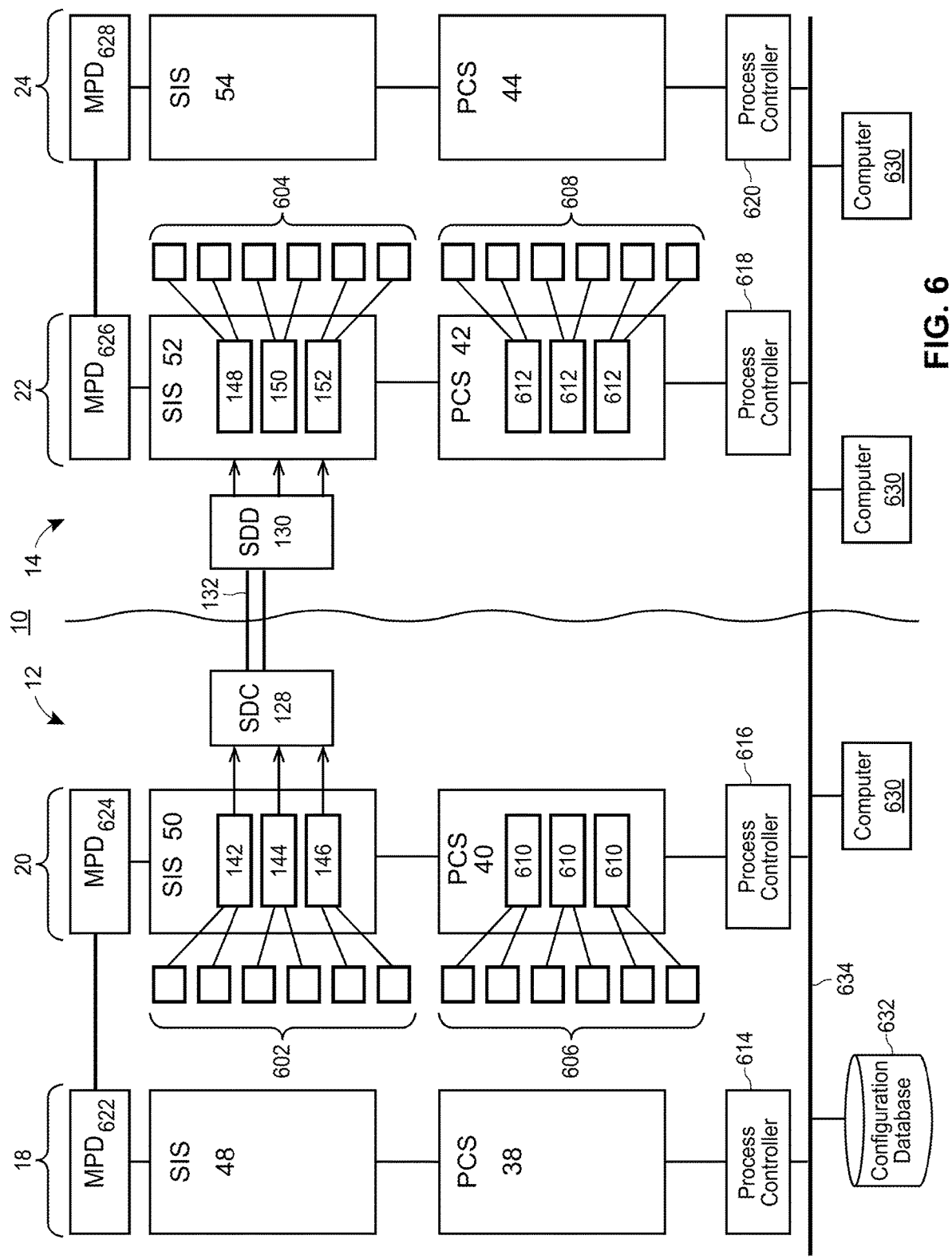
FIG. 6 depicts a more detailed block diagram of the exemplary long-haul process plant and the exemplary long-haul safety instrumented system of FIG. 1.

FIG. 6 depicts a block diagram of an embodiment of the exemplary long-haul process plant and the exemplary long-haul safety instrumented system of FIG. 1. In particular, FIG. 6 illustrates the local environment portion 20 of local environment 12 and the remote environment portion 22 of remote environment 14 in additional detail. It should be understood that the local environment portion 18 of local environment 12 and the remote environment portion 24 of remote environment 14 are shown in FIG. 6 in lesser detail for simplicity, but may include similar features and details in various embodiments.

As shown in FIG. 6, the local environment portion 20 and the remote environment portion 22 of the process plant 10 each include respective one or more safety system field devices 602, 604 located within the plant environment. The safety system field devices 602 are communicatively connected to safety logic solvers 142, 144, 146 of local SIS portion 50, e.g., via various buses, communication lines, wireless networks, etc. installed within the process plant 10. Similarly, the safety system field devices 604 are communicatively connected to safety logic solvers 148, 150, 152 of remote SIS portion 52. The respective safety logic solvers 142, 144, 146 of local SIS portion 50 and safety logic solvers 148, 150, 152 of remote SIS portion 52 enable communications between the safety system field devices 602, 604 and their respective process controllers 616, 620.

Similarly, the local environment portion 20 and the remote environment portion 22 each include respective process control field devices 606, 608 located within the plant environment. The process control field devices 606 are each communicatively connected to respective process control I/O devices 610 of local PCS portion 40, e.g., via various buses, communication lines, wireless networks, etc. installed within the process plant 10. Similarly, the process control field devices 608 are each communicatively connected to respective process control I/O devices 612 of remote PCS portion 42. The respective process control I/O devices 610 of local PCS portion 40 and process control I/O devices 612 of remote PCS portion 42 enable communications between the process control field devices 606, 608 and their respective process controllers 616, 618.

In various embodiments, the safety system field devices 602, 604, and process control field devices 606, 608 include, for example, valves, valve positioners, switches and transmitters (e.g., temperature, pressure, level and flow rate sensors), and generally perform physical or process control functions such as opening or closing valves, measuring process parameters such as pressure, temperature, etc. to control one or more industrial processes executing within the process plant or system. Additionally, in some embodiments, the safety system field devices 602, 604, and process control field devices 606, 608 include smart field devices, such as the field devices conforming to the well-known Fieldbus protocol, which can perform, e.g., control calculations, alarming functions, and other control functions commonly implemented within a process controller such as, e.g., process controller 616, 618.

Furthermore, as shown in FIG. 6, the local environment portion 18, the local environment portion 20, the remote environment portion 22, and the remote environment portion 24 each include respective message propagation devices (MPDs) 622, 624, 626, and 628. Each MPD is communicatively connected to a respective SIS portion 48, 50, 52, 54. Moreover, the MPDs 622, 624 at local environment portions 18 and 20 are communicatively connected to one another by one or more links (e.g., a ring type bus connection, and/or other suitable type of connection) via which safety messages are transmitted and received between the local environment portions 18 and 20. Similarly, the MPDs 626, 628 at remote environment portions 22 and 24 are also communicatively connected to one another by one or more suitable links via which safety messages are transmitted and received between the local environment portions 22 and 24.

Moreover, the process plant 10 further includes one or more host workstations, computers or user interfaces (e.g., personal computers, workstations, etc.) 630 accessible by plant personnel, such as process control operators, maintenance personnel, configuration engineers, etc. Each computer 630 is connected to a configuration database 632 via a common communication line or bus 634. The communication network may be implemented using any desired bus-based or non-bus based hardware, using any desired hard-wired or wireless communication structure and using any desired or suitable communication protocol, such as an Ethernet protocol.

As will be understood, each of the computers 630 may include a processor (not shown), as well as a memory (not shown) storing one or more configuration and/or viewing applications adapted to be executed on the processor. Generally speaking, the one or more configuration applications provide configuration information to a configuration engineer and accordingly enable the configuration engineer to configure some or all elements of the process plant 10 and to store that configuration in the configuration database 632. As part of the configuration activities performed by the one or more configuration applications, a configuration engineer typically creates control routines or control modules for the process controllers 614, 616, 618, 620 and safety logic modules for any and all of the safety logic solvers 142, 144, 146, 148, 150, 152. Furthermore, the configuration engineer typically downloads these different control and safety modules to the appropriate ones of the process controllers 614, 616, 618, 620 and the safety logic solvers 142, 144, 146, 148, 150, 152 via the bus 634. In some instances, one or more configuration applications are used to create and download other programs and logic to the PCS I/O devices 610, 612; any of the safety system field devices 602, 604; any of the process control field devices 606, 608, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A safety instrumented system for use in a long-haul process plant having a process control system, the safety instrumented system comprising a safety data concentrator communicatively connected to one or more safety logic solvers that are disposed in a first portion of the safety instrumented system and that are in operative communication with one or more process control devices of the process control system, where the process control system being serviced by the safety instrumented system, and the one or more process control devices of the process control system performing one or more physical functions to thereby control an industrial process executing in the long-haul process plant. The safety data concentrator is configured to: combine a plurality of safety messages generated by the one or more safety logic solvers into a single, concentrated safety message, the single, concentrated safety message having a total length that is less than a sum of the respective lengths of the plurality of safety messages; and transmit the single, concentrated safety message via a long-haul link to a second portion of the safety instrumented system.

2. The safety instrumented system of the previous aspect, wherein: the one or more safety logic solvers is a first set of one or more safety logic solvers; and the one or more process control devices is a first set of one or more process control devices.

3. The safety instrumented system of any one of the previous aspects, further comprising a safety data de-concentrator communicatively connected to a second set of one or more safety logic solvers that are disposed in the second portion of the safety instrumented system and that are in operative communication with a second set of one or more process control devices of the process control system. The safety data de-concentrator is configured to receive the single, concentrated safety message via the long-haul link, recover the plurality of safety messages from the single, concentrated safety message, and communicate the recovered plurality of safety messages to the second set of one or more safety logic solvers.

4. The safety instrumented system of any one of the previous aspects, wherein the first set of one or more process control devices is disposed in a first portion of the process control system serviced by the first portion of the safety instrumented system.

5. The safety instrumented system of any one of the previous aspects, wherein the second set of one or more process control devices is disposed in a second portion of the process control system that is serviced by the second portion of the safety instrumented system.

6. The safety instrumented system of any one of the previous aspects, wherein the safety data de-concentrator is configured to communicate the recovered plurality of safety messages to the second set of one or more safety logic solvers based on one or more safety conditions indicated in the recovered plurality of safety messages.

7. The safety instrumented system of any one of the previous aspects, wherein the safety data de-concentrator is configured to communicate the recovered plurality of safety messages to the second set of one or more safety logic solvers based on an output of a threshold logic comparator, where the threshold logic comparator is applied to a first set of signals indicative of a first one or more recovered safety messages, and the threshold logic comparator is a first internal logic solver included in the safety data de-concentrator.

8. The safety instrumented system of any one of the previous aspects, wherein the safety data de-concentrator is configured to communicate the recovered plurality of safety messages to the second set of one or more safety logic solvers based on an output of a voting logic comparator, where the voting logic comparator is applied to a second set of signals indicative of a second one or more recovered safety messages, and the voting logic comparator is a second internal logic solver included in the safety data de-concentrator.

9. The safety instrumented system of any one of the previous aspects, wherein the safety data de-concentrator is configured to communicate the recovered plurality of safety messages to the second set of one or more safety logic solvers based on respective outputs of one or more other internal logic solvers that are included in the safety data de-concentrator and that operate on a third set of signals indicative of a third one or more recovered safety messages.

10. The safety instrumented system of any one of the previous aspects, wherein the safety data de-concentrator is configured to communicate the recovered plurality of safety messages to the second set of one or more safety logic solvers based on an absence or a presence of a particular safety message in the recovered plurality of safety messages.

11. The safety instrumented system of any one of the previous aspects, wherein the safety data de-concentrator is configured to communicate the recovered plurality of safety messages to the second set of one or more safety logic solvers based on a content of at least one recovered safety message.

12. The safety instrumented system of any one of the previous aspects, wherein the safety data concentrator is configured to combine the plurality of safety messages into the single, concentrated safety message based on an expected time of transmission of the single, concentrated safety message.

13. The safety instrumented system of any one of the previous aspects, wherein the safety data concentrator is configured to combine the plurality of safety messages into the single, concentrated safety message based on one or more safety conditions indicated in the plurality of safety messages.

14. The safety instrumented system of any one of the previous aspects, wherein the safety data concentrator is configured to combine the plurality of safety messages into the single, concentrated safety message based on an output of a threshold comparator, where the threshold logic comparator is applied to a first set of signals indicative of a first one or more safety messages included in the plurality of safety messages, and the threshold comparator is a first internal logic solver included in the safety data concentrator.

15. The safety instrumented system of any one of the previous aspects, wherein the safety data concentrator is configured to combine the plurality of safety messages into the single, concentrated safety message based on an output of a voting evaluator, where the voting evaluator is applied to a second set of signals indicative of a second one or more safety messages included in the plurality of safety messages, and the voting evaluator is a second internal logic solver included in the safety data concentrator.

16. The safety instrumented system of any one of the previous aspects, wherein the safety data concentrator is configured to combine the plurality of safety messages into the single, concentrated safety message based on respective outputs of one or more other internal logic solvers that are included in the safety data concentrator and that operate on a third set of signals indicative of a third one or more safety messages included in the plurality of safety messages.

17. The safety instrumented system of any one of the previous aspects, wherein the safety data concentrator is configured to combine the plurality of safety messages into the single, concentrated safety message based on an absence or presence of a particular safety message in the plurality of safety messages.

18. The safety instrumented system of any one of the previous aspects, wherein the safety data concentrator is configured to combine the plurality of safety messages into the single, concentrated safety message based on a content of at least one safety message included in the plurality of safety messages.

19. The safety instrumented system of any one of the previous aspects, wherein the safety data concentrator is configured to transmit the single, concentrated safety message based on an expected time of transmission of the single, concentrated safety message.

20. The safety instrumented system of any one of the previous aspects, wherein the safety data concentrator is configured to transmit the single, concentrated safety message based on one or more safety conditions indicated in the plurality of safety messages.

21. The safety instrumented system of any one of the previous aspects, wherein the safety data concentrator is configured to transmit the single, concentrated safety message based on an output of a threshold comparator, where the threshold logic comparator is applied to a first set of signals indicative of a first one or more safety messages included in the plurality of safety messages, and the threshold comparator is a first internal logic solver included in the safety data concentrator.

22. The safety instrumented system of any one of the previous aspects, wherein the safety data concentrator is configured to transmit the single, concentrated safety message based on an output of a voting evaluator, where the voting evaluator is applied to a second set of signals indicative of a second one or more safety messages included in the plurality of safety messages, and the voting evaluator is a second internal logic solver included in the safety data concentrator.

23. The safety instrumented system of any one of the previous aspects, wherein the safety data concentrator is configured to transmit the single, concentrated safety message based on respective outputs of one or more other internal logic solvers that are included in the safety data concentrator and that operate on a third set of signals indicative of a third one or more safety messages included in the plurality of safety messages.

24. The safety instrumented system of any one of the previous aspects, wherein the safety data concentrator is configured to transmit the single, concentrated safety message based on an absence or presence of a particular safety message in the plurality of safety messages.

25. The safety instrumented system of any one of the previous aspects, wherein the safety data concentrator is configured to transmit the single, concentrated safety message based on a content of at least one safety message included in the plurality of safety messages.

26. The safety instrumented system of any one of the previous aspects, further comprising a second link via which safety messages are transmitted between two or more portions of the safety instrumented system; wherein the long-haul link has a bandwidth that is less than a bandwidth of the second link; and wherein a geographical distance between the first portion of the safety instrumented system and the second portion of the safety instrumented system is greater than a geographical distance between any two portions of the safety instrumented system supported by the second link.

27. The safety instrumented system of any one of the previous aspects, wherein the long-haul link is an optical fiber link, an undersea cable, a long range wireless link, a communication link that is overlaid onto or supported by a wired communication link, or a lower-bandwidth virtual link included in a higher-bandwidth link.

28. The safety instrumented system of any one of the previous aspects, wherein the one or more logic solvers obtain signals of a particular format from the one or more process control devices, and wherein the plurality of safety messages generated by the one or more logic solvers are of the particular format and are obtained by the safety data concentrator.

29. The safety instrumented system of any one of the previous aspects, wherein the particular format is implemented at the I/O level of the process control system.

30. A method for use in a safety instrumented system servicing a process control system of a long-haul process plant, the method comprising: receiving, at a safety data concentrator communicatively connected to a first set of one or more safety logic solvers that are disposed in a first portion of the safety instrumented system and that are in operative communication with a first set of one or more process control devices of the process control system of the long-haul process plant, a plurality of safety messages generated by the first set of one or more safety logic solvers; combining, by the safety data concentrator, the plurality of safety messages into a single, concentrated safety message, the single, concentrated safety message having a total length that is less than a sum of the individual lengths of the plurality of safety messages; and transmitting, by the safety data concentrator, via a long-haul link to a second portion of the safety instrumented system, the single, concentrated safety message to a safety data de-concentrator communicatively connected to a second set of one or more safety logic solvers that are disposed in the second portion of the safety instrumented system and that are in operative communication with a second set of one or more process control devices of the process control system, where the safety data de-concentrator is configured to recover the plurality of safety messages from the single, concentrated safety message for communication to the second set of safety logic solvers, and the first set of one or more process control devices and the second set of one or more process control devices perform one or more physical functions to thereby control an industrial process executing in the long-haul process plant.

31. The method of aspect 30 performed by any one of the safety instrumented systems of aspects 1-29.

32. The method of any one of aspects 30-31, wherein combining the plurality of safety messages into the single, concentrated safety message comprises combining the plurality of safety messages into the single, concentrated safety message based on an expected time of transmission of the single, concentrated safety message.

33. The method of any one of aspects 30-32, wherein combining the plurality of safety messages into the single concentrated safety message comprises combining a plurality of safety messages into the single, concentrated safety message based on one or more safety conditions indicated by at least one safety message included in the plurality of safety messages.

34. The method of any one of aspects 30-33, wherein combining the plurality of safety messages into the single concentrated safety message comprises combining a plurality of safety messages into the single, concentrated safety message based on an output of a threshold comparator, where the threshold logic comparator is applied to a first set of signals indicative of a first one or more safety messages included in the plurality of safety messages, and the threshold comparator is a first internal logic solver included in the safety data concentrator.

35. The method of any one of aspects 30-34, wherein combining the plurality of safety messages into the single concentrated safety message comprises combining a plurality of safety messages into the single, concentrated safety message based on an output of a voting evaluator, where the voting evaluator is applied to a second set of signals indicative of a second one or more safety messages included in the plurality of safety messages, and the voting evaluator is a second internal logic solver included in the safety data concentrator.

36. The method of any one of aspects 30-35, wherein combining the plurality of safety messages into the single concentrated safety message comprises combining a plurality of safety messages into the single, concentrated safety message based on respective outputs of one or more other internal logic solvers that are included in the safety data concentrator and that operate on a third set of signals indicative of a third one or more safety messages included in the plurality of safety messages.

37. The method of any one of aspects 30-36, wherein combining the plurality of safety messages into the single concentrated safety message comprises combining a plurality of safety messages into the single, concentrated safety message based on an absence or presence of a particular safety message in the plurality of safety messages.

38. The method of any one of aspects 30-37, wherein combining the plurality of safety messages into the single concentrated safety message comprises combining a plurality of safety messages into the single, concentrated safety message based on a content of at least one safety message included in the plurality of safety messages.

39. The method of any one of aspects 30-38, wherein transmitting the single, concentrated safety message comprises transmitting the single, concentrated safety message based on an expected time of transmission of the single, concentrated safety message.

40. The method of any one of aspects 30-39, wherein transmitting the single, concentrated safety message comprises transmitting the single, concentrated safety message based on one or more safety conditions indicated by at least one safety message included in the plurality of safety messages.

41. The method of any one of aspects 30-40, wherein transmitting the single, concentrated safety message comprises transmitting the single, concentrated safety message based on an output of a threshold comparator, where the threshold logic comparator is applied to a first set of signals indicative of a first one or more safety messages included in the plurality of safety messages, and the threshold comparator is a first internal logic solver included in the safety data concentrator.

42. The method of any one of aspects 30-41, wherein transmitting the single, concentrated safety message comprises transmitting the single, concentrated safety message based on an output of a voting evaluator, where the voting evaluator is applied to a second set of signals indicative of a second one or more safety messages included in the plurality of safety messages, and the voting evaluator is a second internal logic solver included in the safety data concentrator.

43. The method of any one of aspects 30-42, wherein transmitting the single, concentrated safety message comprises transmitting the single, concentrated safety message based on respective outputs of one or more other internal logic solvers that are included in the safety data concentrator and that operate on a third set of signals indicative of a third one or more safety messages included in the plurality of safety messages.

44. The method of any one of aspects 30-43, wherein transmitting the single, concentrated safety message comprises transmitting the single, concentrated safety message based on an absence or presence of a particular safety message in the plurality of safety messages.

45. The method of any one of aspects 30-44, wherein transmitting the single, concentrated safety message comprises transmitting the single, concentrated safety message based on a content of at least one safety message included in the plurality of safety messages.

46. The method of any one of aspects 30-45, wherein combining the plurality of safety messages into the single, concentrated safety message further comprises combining a plurality of safety messages generated by one particular safety logic solver of the first set of one or more safety logic solvers into the single, concentrated safety message.

47. The method of any one of aspects 30-46, wherein combining the plurality of safety messages into the single, concentrated safety message further comprises combining safety messages generated by more than one logic solver included in the first set of one or more safety logic solvers into the single, concentrated safety message.

48. The method of any one of aspects 30-47, wherein combining the plurality of safety messages into the single, concentrated safety message further comprises combining a plurality of different types of safety messages into the single, concentrated safety message.

49. The method of any one of aspects 30-48, further comprising transmitting other safety messages via a second link between two or more portions of the safety instrumented system; and wherein the long-haul link has a bandwidth that is less than a bandwidth of the second link, and a geographical distance between the first portion of the safety instrumented system and the second portion of the safety instrumented system is greater than a geographical distance between any two portions of the safety instrumented system supported by the second link.

50. The method of any one of aspects 30-49, wherein transmitting the single, concentrated safety message to the safety data de-concentrator via the long-haul link comprises transmitting the single, concentrated safety message to the safety data de-concentrator via an optical fiber link, an undersea cable, a long range wireless link, a communication link that is overlaid onto or supported by a wired communication link, or a lower-bandwidth virtual link included in a higher-bandwidth link.

51. The method of any one of aspects 30-50, wherein: the safety data de-concentrator is a particular safety data de-concentrator; the long-haul link is a particular long-haul link; and the method further comprises transmitting, by the safety data concentrator via a plurality of long-haul links, the single, concentrated safety message to a plurality of safety data de-concentrators, the plurality of safety data de-concentrators including the particular safety data de-concentrator, and the plurality of long-haul links including the particular long-haul link.

52. The method of any one of aspects 30-51, wherein the single, concentrated safety message is a particular concentrated safety message, and wherein the method further comprises transmitting, by the safety data concentrator via the long-haul link, a plurality of concentrated safety messages to the safety data de-concentrator, the plurality of concentrated safety messages including the particular concentrated safety message.

53. The method of any one of aspects 30-52, wherein: the single, concentrated safety message is a particular single, concentrated safety message; the safety data de-concentrator is a particular safety data de-concentrator; the long-haul link is a particular long-haul link; and the method further comprises transmitting, by the safety data concentrator via a plurality of long-haul links, a plurality of concentrated safety messages to a plurality of safety data de-concentrators, the plurality of concentrated safety messages including the particular concentrated safety message, the plurality of safety data de-concentrators including the particular safety data de-concentrator, and the plurality of long-haul links including the particular long-haul link.

54. A method for use in a safety instrumented system servicing a process control system of a long-haul process plant, the method comprising: receiving, by a safety data de-concentrator, via a long-haul link from a first portion of the safety instrumented system, a single, concentrated safety message transmitted by a safety data concentrator communicatively connected to a first set of one or more safety logic solvers that are disposed in the first portion of the safety instrumented system and that are in operative communication with a first set of one or more process control devices of the process control system, where the safety data concentrator is configured to combine a plurality of safety messages generated by the first set of one or more safety logic solvers into the single, concentrated safety message, the single, concentrated safety message having a total length that is less than a sum of the individual lengths of the plurality of safety messages, the safety data de-concentrator is communicatively connected to a second set of one or more safety logic solvers that are disposed in a second portion of the safety system and that are in operative communication with a second set of one or more process control devices of the process control system, and the first set of one or more process control devices and the second set of one or more process control devices perform one or more physical functions thereby controlling an industrial process executing in the long-haul process plant. The method further comprises recovering, by the safety data de-concentrator, the plurality of safety messages from the single, concentrated safety message; and communicating the recovered plurality of safety messages to the second set of one or more safety logic solvers.

55. The method of aspect 54, in combination with any one of the methods of aspects 30-53.

56. The method of any one of aspects 54-55 performed by any one of the safety instrumented systems of aspects 1-29.

57. The method of any one of aspects 54-56, wherein the plurality of safety messages were at least one of combined or transmitted by the safety data concentrator based on an expected time of transmission of the single, concentrated safety message.

58. The method of any one of aspects 54-57, wherein the plurality of safety messages were at least one of combined or transmitted by the safety data concentrator based on one or more safety conditions indicated in the plurality of safety messages;

59. The method of any one of aspects 54-58, wherein the plurality of safety messages were at least one of combined or transmitted by the safety data concentrator based on an output of a threshold comparator, the threshold logic comparator applied to a first set of signals indicative of a first one or more safety messages included in the plurality of safety messages, and the threshold comparator being a first internal logic solver included in the safety data concentrator;

60. The method of any one of aspects 54-59, wherein the plurality of safety messages were at least one of combined or transmitted by the safety data concentrator based on an output of a voting evaluator, the voting evaluator applied to a second set of signals indicative of a second one or more safety messages included in the plurality of safety messages, and the voting evaluator being a second internal logic solver included in the safety data concentrator;

61. The method of any one of aspects 54-60, wherein the plurality of safety messages were at least one of combined or transmitted by the safety data concentrator based on respective outputs of one or more other internal logic solvers that are included in the safety data concentrator and that operate on a third set of signals indicative of a third one or more safety messages included in the plurality of safety messages.

62. The method of any one of aspects 54-61, wherein the plurality of safety messages were at least one of combined or transmitted by the safety data concentrator based on an absence or presence of a particular safety message in the plurality of safety messages.

63. The method of any one of aspects 54-62, wherein the plurality of safety messages were at least one of combined or transmitted by the safety data concentrator based on a content of at least one safety message included in the plurality of safety messages.

64. The method of any one of aspects 54-63, further comprising receiving safety messages transmitted via a second link between two or more portions of the safety instrumented system; and wherein the long-haul link has a bandwidth that is less than a bandwidth of the second link, and a geographical distance between the first portion of the safety instrumented system and the second portion of the safety instrumented system is greater than a geographical distance between any two portions of the safety instrumented system supported by the second link.

65. The method of any one of aspects 54-64, wherein receiving the single, concentrated safety message transmitted by a safety data concentrator via the long-haul link from the first portion of the safety instrumented system comprises receiving the single, concentrated safety message transmitted by the safety data concentrator via an optical fiber link, an undersea cable, a long range wireless link, a communication link that is overlaid onto or supported by a wired communication link, or a lower-bandwidth virtual link included in a higher-bandwidth link.

66. The method of any one of aspects 54-65, wherein communicating the recovered plurality of safety messages to the second set of one or more safety logic solvers comprises communicating one or more of the recovered plurality of safety messages based on one or more safety conditions indicated in the recovered plurality of safety messages.

67. The method of any one of aspects 54-66, wherein communicating the recovered plurality of safety messages to the second set of one or more safety logic solvers comprises communicating one or more of the recovered plurality of safety messages based on an output of a threshold logic comparator, the threshold logic comparator applied to a first set of signals indicative of a first one or more recovered safety messages, and the threshold logic comparator being a first internal logic solver included in the safety data de-concentrator.

68. The method of any one of aspects 54-67, wherein communicating the recovered plurality of safety messages to the second set of one or more safety logic solvers comprises communicating one or more of the recovered plurality of safety messages based on an output of a voting logic comparator, the voting logic comparator applied to a second set of signals indicative of a second one or more recovered safety messages, and the voting logic comparator being a second internal logic solver included in the safety data de-concentrator.

69. The method of any one of aspects 54-68, wherein communicating the recovered plurality of safety messages to the second set of one or more safety logic solvers comprises communicating one or more of the recovered plurality of safety messages based on respective outputs of one or more other internal logic solvers that are included in the safety data de-concentrator and that operate on a third set of signals indicative of a third one or more recovered safety messages.

70. The method of any one of aspects 54-69, wherein communicating the recovered plurality of safety messages to the second set of one or more safety logic solvers comprises communicating one or more of the recovered plurality of safety messages based on an absence or a presence of a particular safety message in the recovered plurality of safety messages.

71. The method of any one of aspects 54-70, wherein communicating the recovered plurality of safety messages to the second set of one or more safety logic solvers comprises communicating one or more of the recovered plurality of safety messages based on a content of at least one recovered safety message.

72. The method of any one of aspects 54-71, wherein the long-haul link is a particular long-haul link included in a plurality of long-haul links communicatively connecting the first portion of the safety instrumented system and the second portion of the safety instrumented system; and the method further comprises: receiving, via the plurality of long-haul links, one or more additional concentrated safety messages transmitted by one or more additional safety data concentrators disposed in the first portion of the safety instrumented system; recovering a respective plurality of safety messages from each of the one or more additional concentrated safety messages; and communicating at least some of the recovered safety messages to the second set of one or more safety logic solvers.

73. The method of any one of aspects 54-72, further comprising determining the at least some of the recovered safety messages that are to be communicated to the second set of one or more safety logic solvers based on one or more of: an output of a threshold logic comparator, the threshold logic comparator applied to a first set of signals corresponding to the one or more additional concentrated safety messages, the threshold logic comparator being a first internal logic solver included in the safety data de-concentrator; an output of a voting logic evaluator, the voting logic evaluator applied to a second set of signals corresponding to the one or more additional concentrated safety messages, the voting logic evaluator being a second internal logic solver included in the safety data de-concentrator; or respective outputs of one or more other internal logic solvers that are included in the safety data de-concentrator and that operate on a third set of signals corresponding to the one or more additional concentrated safety messages.

74. The method of any one of aspects 54-73, further comprising: generating an additional safety message based upon the one or more of: the output of the threshold logic comparator, the output of the voting logic evaluator, or the respective outputs of the one or more other internal logic solvers of the safety data de-concentrator; and communicating the additional safety message to one or more recipient safety logic solvers disposed in the second portion of the safety instrumented system.

75. Any one of the previous aspects in combination with any other one of the previous aspects.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A safety instrumented system for use in a long-haul process plant having a process control system, the safety instrumented system comprising:
    a safety data concentrator communicatively connected to a first set of one or more safety logic solvers that are disposed in a first portion of the safety instrumented system and that are in operative communication with a first set of one or more process control devices of the process control system,
        the process control system being serviced by the safety instrumented system,
        the one or more process control devices of the process control system performing one or more physical functions to thereby control an industrial process executing in the long-haul process plant, and
        the safety data concentrator configured to:
            combine a plurality of safety messages generated by the first set of one or more safety logic solvers into a single, concentrated safety message, the single, concentrated safety message having a total length that is less than a sum of the respective lengths of the plurality of safety messages; and
            transmit the single, concentrated safety message via a long-haul link to a second portion of the safety instrumented system; and
    a safety data de-concentrator communicatively connected to a second set of one or more safety logic solvers that are disposed in the second portion of the safety instrumented system and that are in operative communication with a second set of one or more process control devices of the process control system, the safety data de-concentrator configured to receive the single, concentrated safety message via the long-haul link, recover the plurality of safety messages from the single, concentrated safety message, and communicate the recovered plurality of safety messages to the second set of one or more safety logic solvers.

2. The safety instrumented system of claim 1, wherein the first set of one or more process control devices is disposed in a first portion of the process control system serviced by the first portion of the safety instrumented system, and wherein the second set of one or more process control devices is disposed in a second portion of the process control system serviced by the second portion of the safety instrumented system.

3. The safety instrumented system of claim 1, wherein the safety data de-concentrator is configured to communicate the recovered plurality of safety messages to the second set of one or more safety logic solvers based on one or more of:
- one or more safety conditions indicated in the recovered plurality of safety messages;
- an output of a threshold logic comparator, the threshold logic comparator applied to a first set of signals indicative of a first one or more recovered safety messages, and the threshold logic comparator being a first internal logic solver included in the safety data de-concentrator;
- an output of a voting logic comparator, the voting logic comparator applied to a second set of signals indicative of a second one or more recovered safety messages, and the voting logic comparator being a second internal logic solver included in the safety data de-concentrator;
- respective outputs of one or more other internal logic solvers that are included in the safety data de-concentrator and that operate on a third set of signals indicative of a third one or more recovered safety messages;
- an absence or a presence of a particular safety message in the recovered plurality of safety messages; or
- a content of at least one recovered safety message.

4. The safety instrumented system of claim 1, wherein the safety data concentrator is configured to combine the plurality of safety messages into the single, concentrated safety message based on at least one of:
- an expected time of transmission of the single, concentrated safety message;
- one or more safety conditions indicated in the plurality of safety messages;
- an output of a threshold comparator, the threshold logic comparator applied to a first set of signals indicative of a first one or more safety messages included in the plurality of safety messages, and the threshold comparator being a first internal logic solver included in the safety data concentrator;
- an output of a voting evaluator, the voting evaluator applied to a second set of signals indicative of a second one or more safety messages included in the plurality of safety messages, and the voting evaluator being a second internal logic solver included in the safety data concentrator;
- respective outputs of one or more other internal logic solvers that are included in the safety data concentrator and that operate on a third set of signals indicative of a third one or more safety messages included in the plurality of safety messages;
- an absence or presence of a particular safety message in the plurality of safety messages; or
- a content of at least one safety message included in the plurality of safety messages.

5. The safety instrumented system of claim 1, wherein the safety data concentrator is configured to transmit the single, concentrated safety message based on one or more of:
- an expected time of transmission of the single, concentrated safety message;
- one or more safety conditions indicated in the plurality of safety messages;
- an output of a threshold comparator, the threshold logic comparator applied to a first set of signals indicative of a first one or more safety messages included in the plurality of safety messages, and the threshold comparator being a first internal logic solver included in the safety data concentrator;
- an output of a voting evaluator, the voting evaluator applied to a second set of signals indicative of a second one or more safety messages included in the plurality of safety messages, and the voting evaluator being a second internal logic solver included in the safety data concentrator;
- respective outputs of one or more other internal logic solvers that are included in the safety data concentrator and that operate on a third set of signals indicative of a third one or more safety messages included in the plurality of safety messages;
- an absence or presence of a particular safety message in the plurality of safety messages; or
- a content of at least one safety message included in the plurality of safety messages.

6. The safety instrumented system of claim 1,
- further comprising a second link via which safety messages are transmitted between two or more portions of the safety instrumented system;
- wherein the long-haul link has a bandwidth that is less than a bandwidth of the second link; and
- wherein a geographical distance between the first portion of the safety instrumented system and the second portion of the safety instrumented system is greater than a geographical distance between any two portions of the safety instrumented system supported by the second link.

7. The safety instrumented system of claim 1, wherein the long-haul link is an optical fiber link, an undersea cable, a long range wireless link, a communication link that is overlaid onto or supported by a wired communication link, or a lower-bandwidth virtual link included in a higher-bandwidth link.

8. The safety instrumented system of claim 1, wherein the one or more logic solvers obtain signals of a particular format from the one or more process control devices, and wherein the plurality of safety messages generated by the one or more logic solvers are of the particular format and are obtained by the safety data concentrator.

9. The safety instrumented system of claim 1, wherein the particular format is implemented at the I/O level of the process control system.

10. A method for use in a safety instrumented system servicing a process control system of a long-haul process plant, the method comprising:
- receiving, at a safety data concentrator communicatively connected to a first set of one or more safety logic solvers that are disposed in a first portion of the safety instrumented system and that are in operative communication with a first set of one or more process control devices of the process control system of the long-haul process plant, a plurality of safety messages generated by the first set of one or more safety logic solvers;
- combining, by the safety data concentrator, the plurality of safety messages into a single, concentrated safety message, the single, concentrated safety message having a total length that is less than a sum of the individual lengths of the plurality of safety messages; and
- transmitting, by the safety data concentrator, via a long-haul link to a second portion of the safety instrumented system, the single, concentrated safety message to a safety data de-concentrator communicatively connected to a second set of one or more safety logic solvers that are disposed in the second portion of the safety instrumented system and that are in operative communication with a second set of one or more process control devices of the process control system, the safety data de-concentrator configured to recover the plurality of safety messages from the single, concentrated safety message for communication to the second set of safety logic solvers, and the first set of one or more process control devices and the second set of one or more process control devices performing one or more physical functions to thereby control an industrial process executing in the long-haul process plant.

11. The method of claim 10, wherein combining the plurality of safety messages into the single, concentrated safety message comprises combining the plurality of safety messages into the single, concentrated safety message based on at least one of:

an expected time of transmission of the single, concentrated safety message;

one or more safety conditions indicated by at least one safety message included in the plurality of safety messages;

an output of a threshold comparator, the threshold logic comparator applied to a first set of signals indicative of a first one or more safety messages included in the plurality of safety messages, and the threshold comparator being a first internal logic solver included in the safety data concentrator;

an output of a voting evaluator, the voting evaluator applied to a second set of signals indicative of a second one or more safety messages included in the plurality of safety messages, and the voting evaluator being a second internal logic solver included in the safety data concentrator;

respective outputs of one or more other internal logic solvers that are included in the safety data concentrator and that operate on a third set of signals indicative of a third one or more safety messages included in the plurality of safety messages;

an absence or presence of a particular safety message in the plurality of safety messages; or a content of at least one safety message included in the plurality of safety messages.

12. The method of claim 10, wherein transmitting the single, concentrated safety message further comprises transmitting the single, concentrated safety message based on one or more of:

an expected time of transmission of the single, concentrated safety message;

one or more safety conditions indicated by at least one of the plurality of safety messages;

an output of a threshold comparator, the threshold logic comparator applied to a first set of signals indicative of a first one or more safety messages included in the plurality of safety messages, and the threshold comparator being a first internal logic solver included in the safety data concentrator;

an output of a voting evaluator, the voting evaluator applied to a second set of signals indicative of a second one or more safety messages included in the plurality of safety messages, and the voting evaluator being a second internal logic solver included in the safety data concentrator;

respective outputs of one or more other internal logic solvers that are included in the safety data concentrator and that operate on a third set of signals indicative of a third one or more safety messages included in the plurality of safety messages;

an absence or presence of a particular safety message in the plurality of safety messages; or a content of at least one safety message included in the plurality of safety messages.

13. The method of claim 10, wherein combining the plurality of safety messages into the single, concentrated safety message further comprises combining a plurality of safety messages generated by one particular safety logic solver of the first set of one or more safety logic solvers into the single, concentrated safety message.

14. The method of claim 10, wherein combining the plurality of safety messages into the single, concentrated safety message further comprises combining safety messages generated by more than one logic solver included in the first set of one or more safety logic solvers into the single, concentrated safety message.

15. The method of claim 10, wherein combining the plurality of safety messages into the single, concentrated safety message further comprises combining a plurality of different types of safety messages into the single, concentrated safety message.

16. The method of claim 10, further comprising:

transmitting other safety messages via a second link between two or more portions of the safety instrumented system; and wherein the long-haul link has a bandwidth that is less than a bandwidth of the second link, and a geographical distance between the first portion of the safety instrumented system and the second portion of the safety instrumented system is greater than a geographical distance between any two portions of the safety instrumented system supported by the second link.

17. The method of claim 10, wherein transmitting the single, concentrated safety message to the safety data de-concentrator via the long-haul link comprises:

transmitting the single, concentrated safety message to the safety data de-concentrator via an optical fiber link, an undersea cable, a long range wireless link, a communication link that is overlaid onto or supported by a wired communication link, or a lower-bandwidth virtual link included in a higher-bandwidth link.

18. The method of claim 11, wherein:

the safety data de-concentrator is a particular safety data de-concentrator;

the long-haul link is a particular long-haul link; and the method further comprises transmitting, by the safety data concentrator via a plurality of long-haul links, the single, concentrated safety message to a plurality of safety data de-concentrators, the plurality of safety data de-concentrators including the particular safety data de-concentrator, and the plurality of long-haul links including the particular long-haul link.

19. The method of claim 11, wherein the single, concentrated safety message is a particular concentrated safety message, and wherein the method further comprises transmitting, by the safety data concentrator via the long-haul link, a plurality of concentrated safety messages to the safety data de-concentrator, the plurality of concentrated safety messages including the particular concentrated safety message.

20. The method of claim 11, wherein:

the single, concentrated safety message is a particular single, concentrated safety message;

the safety data de-concentrator is a particular safety data de-concentrator;

the long-haul link is a particular long-haul link; and the method further comprises transmitting, by the safety data concentrator via a plurality of long-haul links, a plurality of concentrated safety messages to a plurality of safety data de-concentrators, the plurality of concentrated safety messages including the particular concentrated safety message, the plurality of safety data de-concentrators including the particular safety data de-concentrator, and the plurality of long-haul links including the particular long-haul link.

21. A method for use in a safety instrumented system servicing a process control system of a long-haul process plant, the method comprising:

receiving, by a safety data de-concentrator, via a long-haul link from a first portion of the safety instrumented system, a single, concentrated safety message transmitted by a safety data concentrator communicatively connected to a first set of one or more safety logic solvers that are disposed in the first portion of the safety instrumented system and that are in operative communication with a first set of one or more process control devices of the process control system, the safety data concentrator configured to combine a plurality of safety messages generated by the first set of one or more safety logic solvers into the single, concentrated safety message, the single, concentrated safety message having a total length that is less than a sum of the individual lengths of the plurality of safety messages, the safety data de-concentrator communicatively connected to a second set of one or more safety logic solvers that are disposed in a second portion of the safety system and that are in operative communication with a second set of one or more process control devices of the process control system, and the first set of one or more process control devices and the second set of one or more process control devices performing one or more physical functions thereby controlling an industrial process executing in the long-haul process plant;

recovering, by the safety data de-concentrator, the plurality of safety messages from the single, concentrated safety message; and communicating the recovered plurality of safety messages to the second set of one or more safety logic solvers.

22. The method of claim 21, wherein the plurality of safety messages were at least one of combined or transmitted by the safety data concentrator based on at least one of:

an expected time of transmission of the single, concentrated safety message;

one or more safety conditions indicated in the plurality of safety messages;

an output of a threshold comparator, the threshold logic comparator applied to a first set of signals indicative of a first one or more safety messages included in the plurality of safety messages, and the threshold comparator being a first internal logic solver included in the safety data concentrator;

an output of a voting evaluator, the voting evaluator applied to a second set of signals indicative of a second one or more safety messages included in the plurality of safety messages, and the voting evaluator being a second internal logic solver included in the safety data concentrator;

respective outputs of one or more other internal logic solvers that are included in the safety data concentrator and that operate on a third set of signals indicative of a third one or more safety messages included in the plurality of safety messages;

an absence or presence of a particular safety message in the plurality of safety messages; or a content of at least one safety message included in the plurality of safety messages.

23. The method of claim 21, further comprising receiving safety messages transmitted via a second link between two or more portions of the safety instrumented system; and wherein the long-haul link has a bandwidth that is less than a bandwidth of the second link, and a geographical distance between the first portion of the safety instrumented system and the second portion of the safety instrumented system is greater than a geographical distance between any two portions of the safety instrumented system supported by the second link.

24. The method of claim 21, wherein receiving the single, concentrated safety message transmitted by a safety data concentrator via the long-haul link from the first portion of the safety instrumented system comprises:

receiving the single, concentrated safety message transmitted by the safety data concentrator via an optical fiber link, an undersea cable, a long range wireless link, a communication link that is overlaid onto or supported by a wired communication link, or a lower-bandwidth virtual link included in a higher-bandwidth link.

25. The method of claim 21, wherein communicating the recovered plurality of safety messages to the second set of one or more safety logic solvers comprises communicating one or more of the recovered plurality of safety messages based on one or more of:

one or more safety conditions indicated in the recovered plurality of safety messages;

an output of a threshold logic comparator, the threshold logic comparator applied to a first set of signals indicative of a first one or more recovered safety messages, and the threshold logic comparator being a first internal logic solver included in the safety data de-concentrator;

an output of a voting logic comparator, the voting logic comparator applied to a second set of signals indicative of a second one or more recovered safety messages, and the voting logic comparator being a second internal logic solver included in the safety data de-concentrator;

respective outputs of one or more other internal logic solvers that are included in the safety data de-concentrator and that operate on a third set of signals indicative of a third one or more recovered safety messages;

an absence or a presence of a particular safety message in the recovered plurality of safety messages; or a content of at least one recovered safety message.

26. The method of claim 21, wherein:

the long-haul link is a particular long-haul link included in a plurality of long-haul links communicatively connecting the first portion of the safety instrumented system and the second portion of the safety instrumented system; and the method further comprises:

receiving, via the plurality of long-haul links, one or more additional concentrated safety messages transmitted by one or more additional safety data concentrators disposed in the first portion of the safety instrumented system;

recovering a respective plurality of safety messages from each of the one or more additional concentrated safety messages; and communicating at least some of the recovered safety messages to the second set of one or more safety logic solvers.

27. The method of claim 21, further comprising determining the at least some of the recovered safety messages that are to be communicated to the second set of one or more safety logic solvers based on one or more of:

an output of a threshold logic comparator, the threshold logic comparator applied to a first set of signals corresponding to the one or more additional concentrated safety messages, the threshold logic comparator being a first internal logic solver included in the safety data de-concentrator;

an output of a voting logic evaluator, the voting logic evaluator applied to a second set of signals corresponding to the one or more additional concentrated safety messages, the voting logic evaluator being a second internal logic solver included in the safety data de-concentrator; or respective outputs of one or more other internal logic solvers that are included in the safety data de-concentrator and that operate on a third set of signals corresponding to the one or more additional concentrated safety messages.

28. The method of claim 27, further comprising:

generating an additional safety message based upon the one or more of: the output of the threshold logic comparator, the output of the voting logic evaluator, or the respective outputs of the one or more other internal logic solvers of the safety data de-concentrator; and communicating the additional safety message to one or more recipient safety logic solvers disposed in the second portion of the safety instrumented system.

* * * * *